United States Patent
Yamamoto et al.

(10) Patent No.: US 11,057,752 B2
(45) Date of Patent: Jul. 6, 2021

(54) DRIVING ASSISTANCE SYSTEM

(71) Applicant: Aichi Steel Corporation, Aichi (JP)

(72) Inventors: Michiharu Yamamoto, Aichi (JP); Tomohiko Nagao, Aichi (JP); Hitoshi Aoyama, Aichi (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

(21) Appl. No.: 16/097,477

(22) PCT Filed: Mar. 30, 2017

(86) PCT No.: PCT/JP2017/013346
§ 371 (c)(1),
(2) Date: Oct. 29, 2018

(87) PCT Pub. No.: WO2017/187881
PCT Pub. Date: Nov. 2, 2017

(65) Prior Publication Data
US 2019/0098468 A1 Mar. 28, 2019

(30) Foreign Application Priority Data
Apr. 28, 2016 (JP) .............................. JP2016-090608

(51) Int. Cl.
*H04W 4/40* (2018.01)
*E01F 11/00* (2006.01)
(Continued)

(52) U.S. Cl.
CPC .............. *H04W 4/40* (2018.02); *E01F 11/00* (2013.01); *G05D 1/02* (2013.01); *G08G 1/042* (2013.01);
(Continued)

(58) Field of Classification Search
CPC ......... H04W 4/40; H04W 4/029; E01F 11/00; G08G 1/042; G08G 1/056; G05D 1/028; G05D 2201/0213; B60W 30/12
(Continued)

(56) References Cited

U.S. PATENT DOCUMENTS 4,079,322 A * 3/1978 Lawrence ........ G08G 1/096716
307/652
5,002,145 A * 3/1991 Wakaumi ................. B62D 1/28
180/168
(Continued)

FOREIGN PATENT DOCUMENTS

CN 101603830 A 12/2009
JP H03-58179 A 3/1991
(Continued)

OTHER PUBLICATIONS

English-language translation of International Search Report and Written Opinion for International Application No. PCT/JP2017/013346, dated Jun. 27, 2017.
(Continued)

*Primary Examiner* — Farid Seyedvosoghi
(74) *Attorney, Agent, or Firm* — XSENSUS LLP

(57) ABSTRACT

Provided is a driving assistance system capable of providing more pieces of information to a vehicle side by using magnetic markers. A driving assistance system (1A) is a system including magnetic markers (1) laid on a travelling road so as to be magnetically detectable and also be able to provide code information to a vehicle side, a vehicle (5) configured to be able to magnetically detect the magnetic markers (1) and also read the code information, and a base station (6) configured to make a reply with corresponding information when receiving the code information from the vehicle (5) reading the code information.

17 Claims, 19 Drawing Sheets

(51) Int. Cl.
*G05D 1/02* (2020.01)
*G08G 1/09* (2006.01)
*H04W 4/029* (2018.01)
*G08G 1/042* (2006.01)
*G08G 1/056* (2006.01)
*B60W 30/12* (2020.01)

(52) U.S. Cl.
CPC ............ *G08G 1/056* (2013.01); *G08G 1/09* (2013.01); *H04W 4/029* (2018.02); *B60W 30/12* (2013.01); *G05D 1/028* (2013.01); *G05D 2201/0213* (2013.01)

(58) Field of Classification Search
USPC ....................................................... 455/456.1
See application file for complete search history.

(56) References Cited

U.S. PATENT DOCUMENTS

| | | | | |
|---|---|---|---|---|
| 5,369,591 | A * | 11/1994 | Broxmeyer | G05D 1/0261 180/167 |
| 5,781,119 | A * | 7/1998 | Yamashita | G05D 1/024 180/168 |
| 5,938,707 | A * | 8/1999 | Uehara | G05D 1/0261 180/167 |
| 5,987,374 | A * | 11/1999 | Akutsu | G08G 1/164 701/117 |
| 7,202,776 | B2 * | 4/2007 | Breed | B60N 2/2863 340/435 |
| 2002/0180602 | A1 * | 12/2002 | Yoakum | A01K 11/007 340/572.8 |
| 2006/0244588 | A1 * | 11/2006 | Hannah | A47F 10/04 340/539.13 |
| 2009/0195391 | A1 * | 8/2009 | Honda | G08B 13/2408 340/572.8 |
| 2010/0001855 | A1 * | 1/2010 | Amir | G06K 7/0008 340/539.3 |
| 2012/0035844 | A1 * | 2/2012 | Ono | B60W 30/12 701/300 |
| 2012/0197519 | A1 * | 8/2012 | Richardson | G01C 21/20 701/408 |
| 2013/0027225 | A1 * | 1/2013 | Siebert | G05D 1/0261 340/933 |
| 2014/0218197 | A1 * | 8/2014 | Li | G08B 13/2437 340/572.6 |
| 2014/0309812 | A1 * | 10/2014 | Lee | H04L 67/12 701/2 |
| 2015/0294430 | A1 * | 10/2015 | Huang | G06Q 50/26 705/7.24 |
| 2016/0042204 | A1 * | 2/2016 | Tan | H01Q 1/12 340/10.1 |
| 2016/0132705 | A1 * | 5/2016 | Kovarik | G06K 7/10376 340/10.3 |

FOREIGN PATENT DOCUMENTS

| | | |
|---|---|---|
| JP | H09-62346 A | 3/1997 |
| JP | 2005-092572 A | 4/2005 |
| JP | 2005-202478 A | 7/2005 |
| JP | 2007-233604 A | 9/2007 |
| JP | 2013-519892 A | 5/2013 |

OTHER PUBLICATIONS

Extended European Search Report dated Feb. 15, 2019 in European Application No. 17789169.4-1002.

* cited by examiner

[FIG. 1]
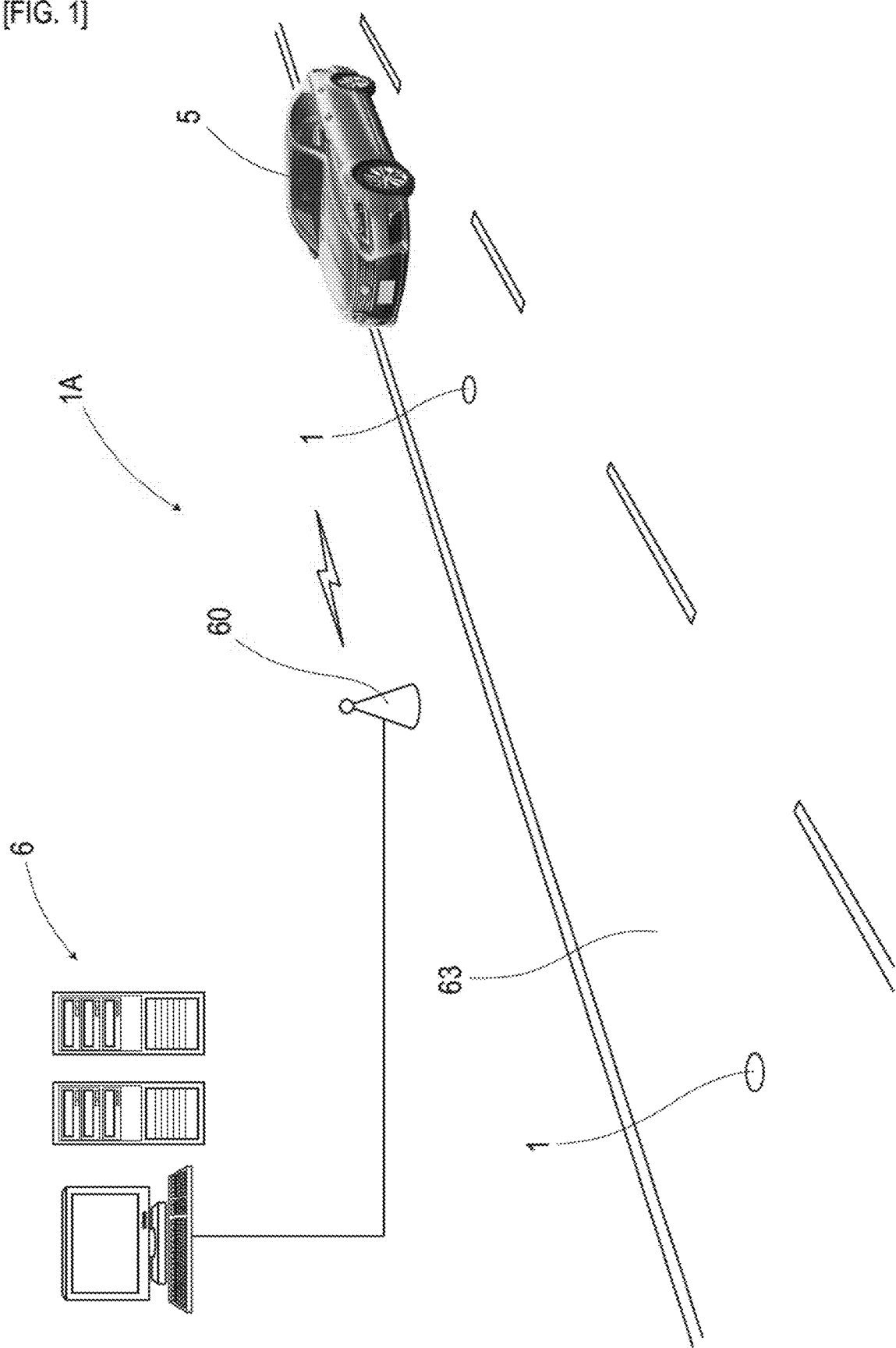

[FIG. 2]
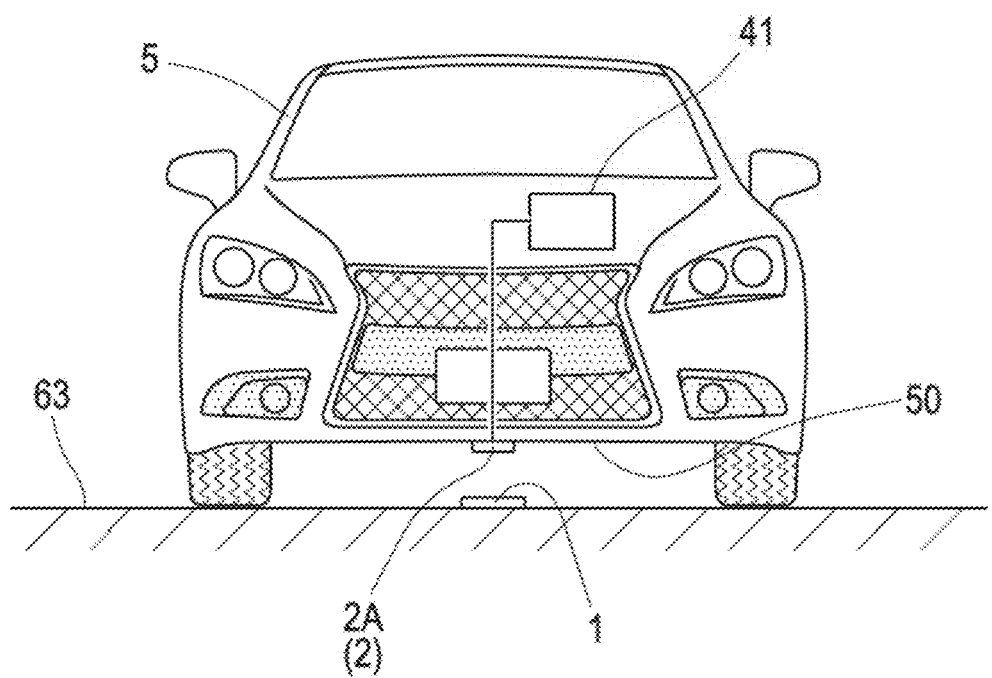

[FIG. 3]
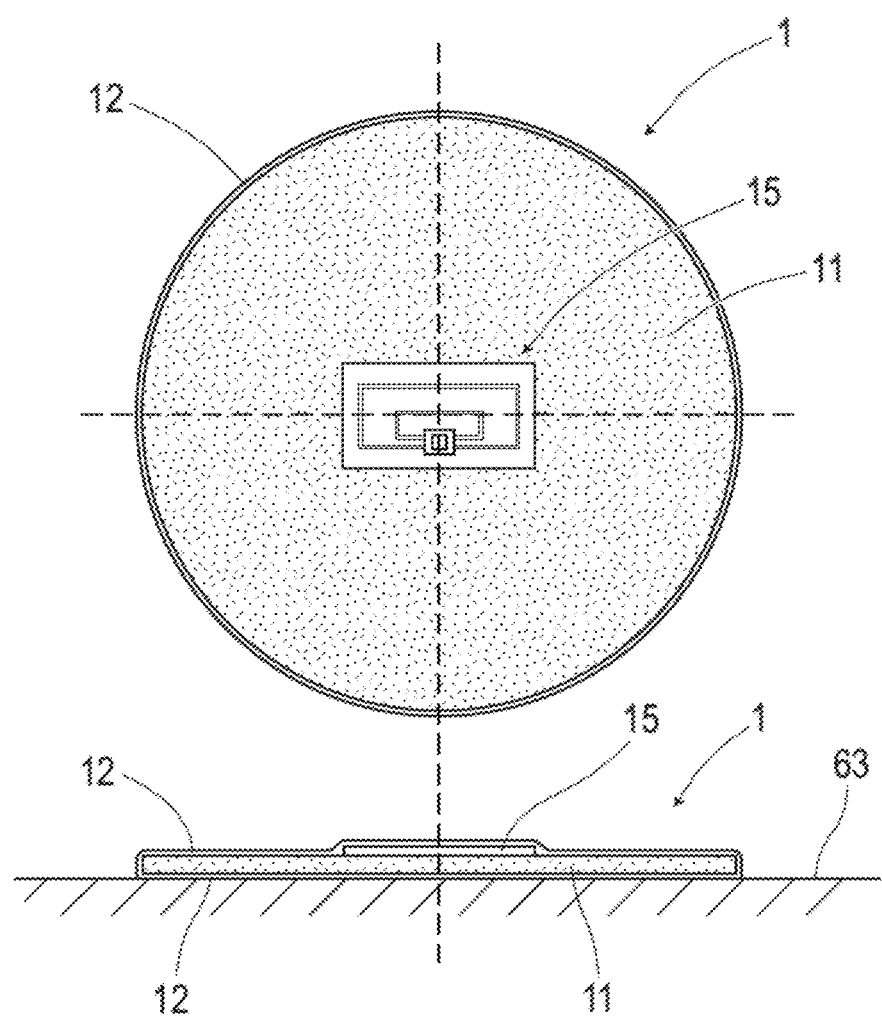

[FIG. 4]
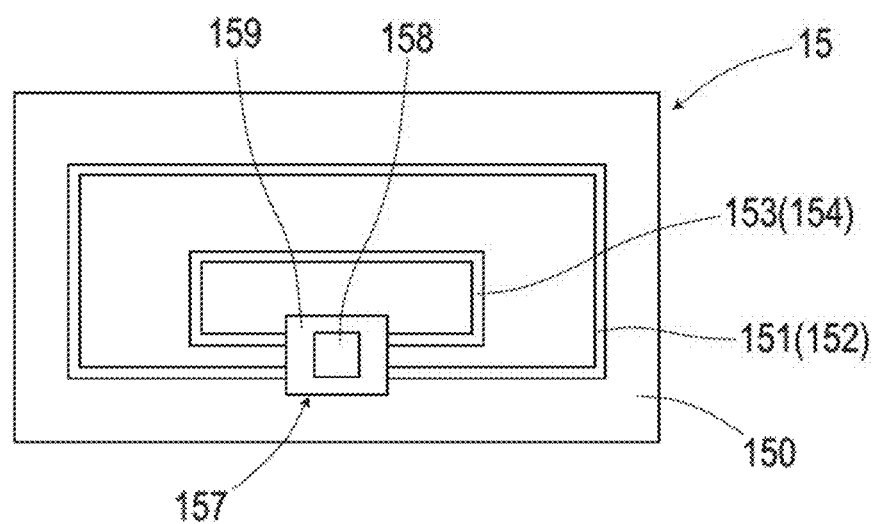

[FIG. 5]
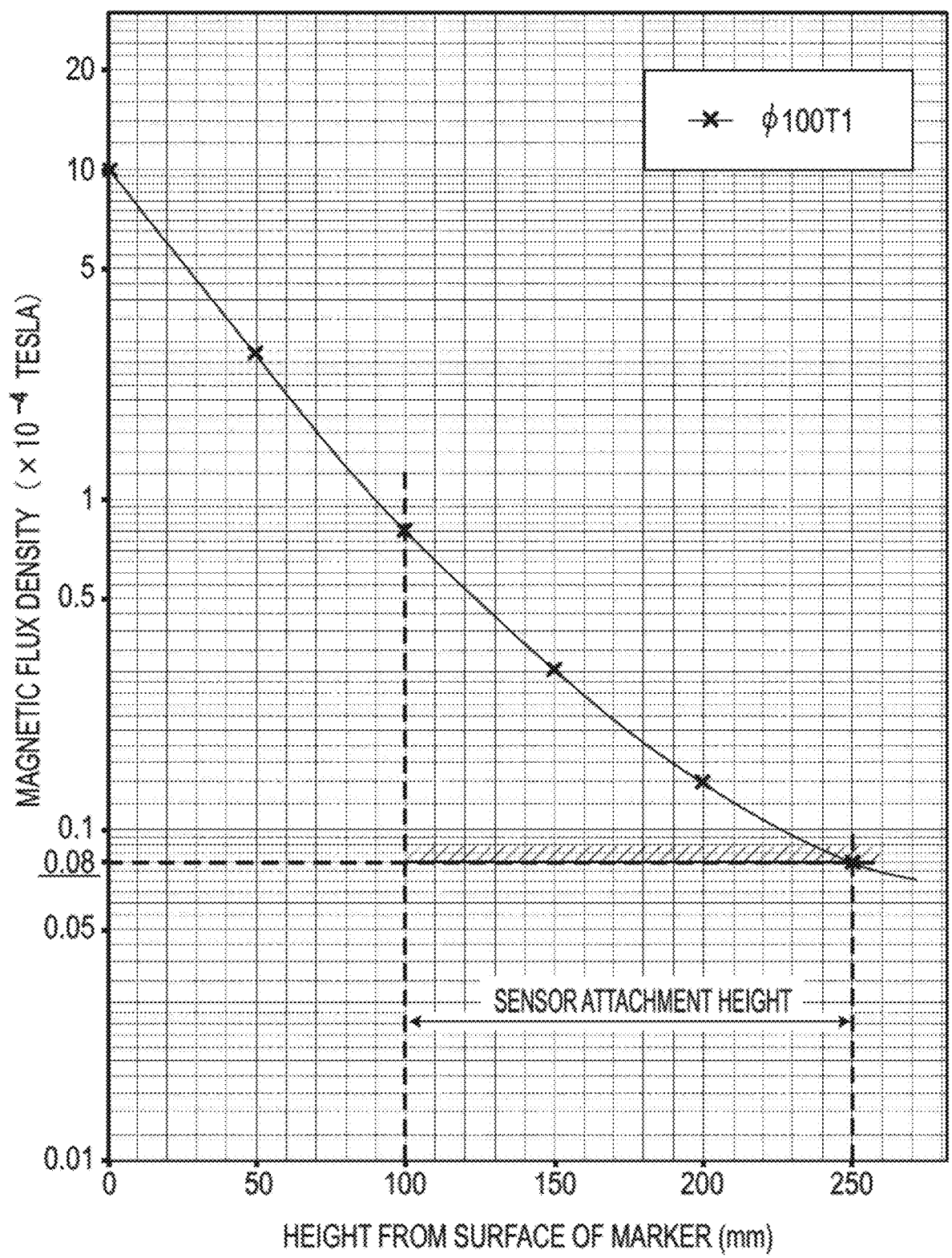

[FIG. 6]
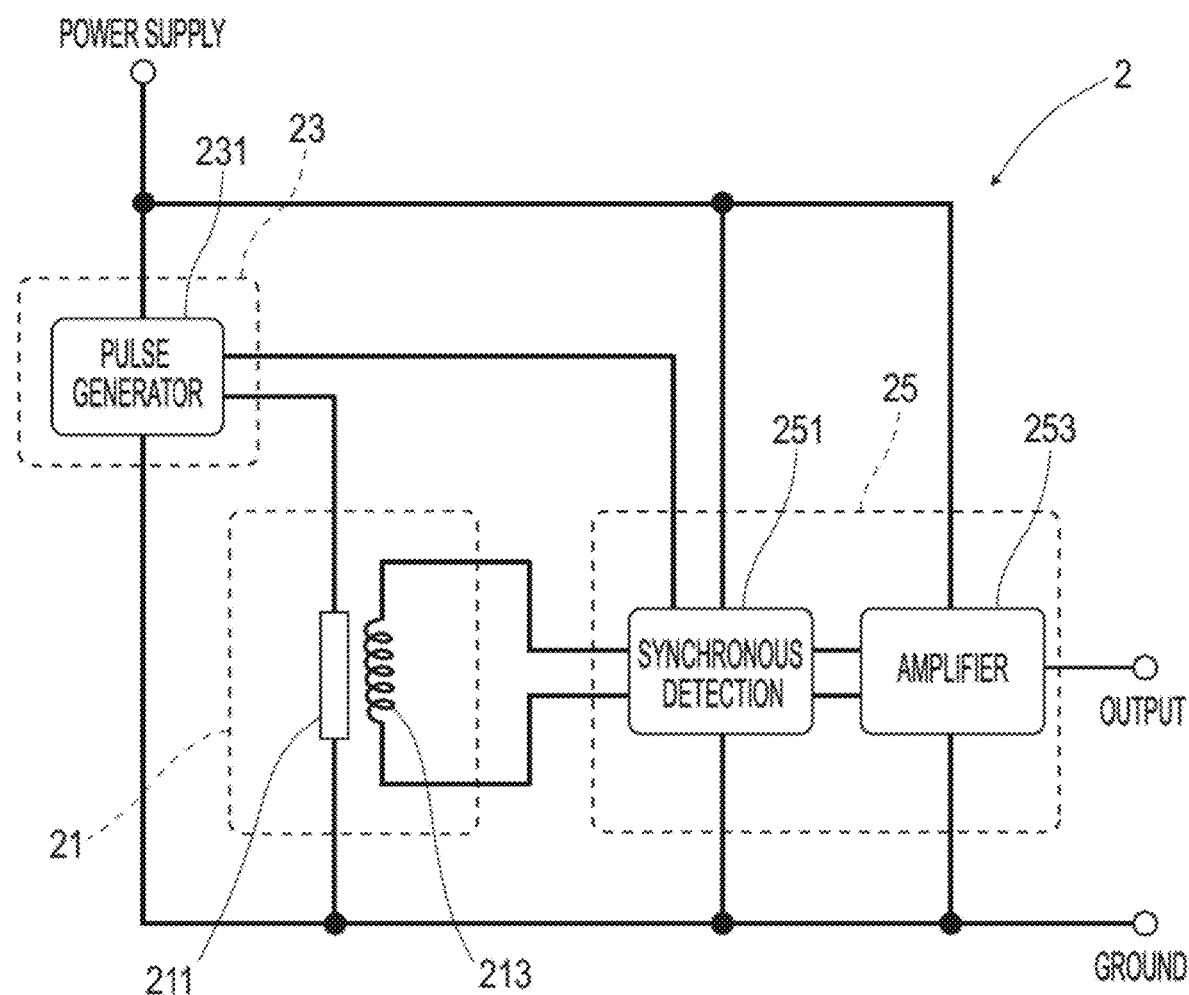

[FIG. 7]
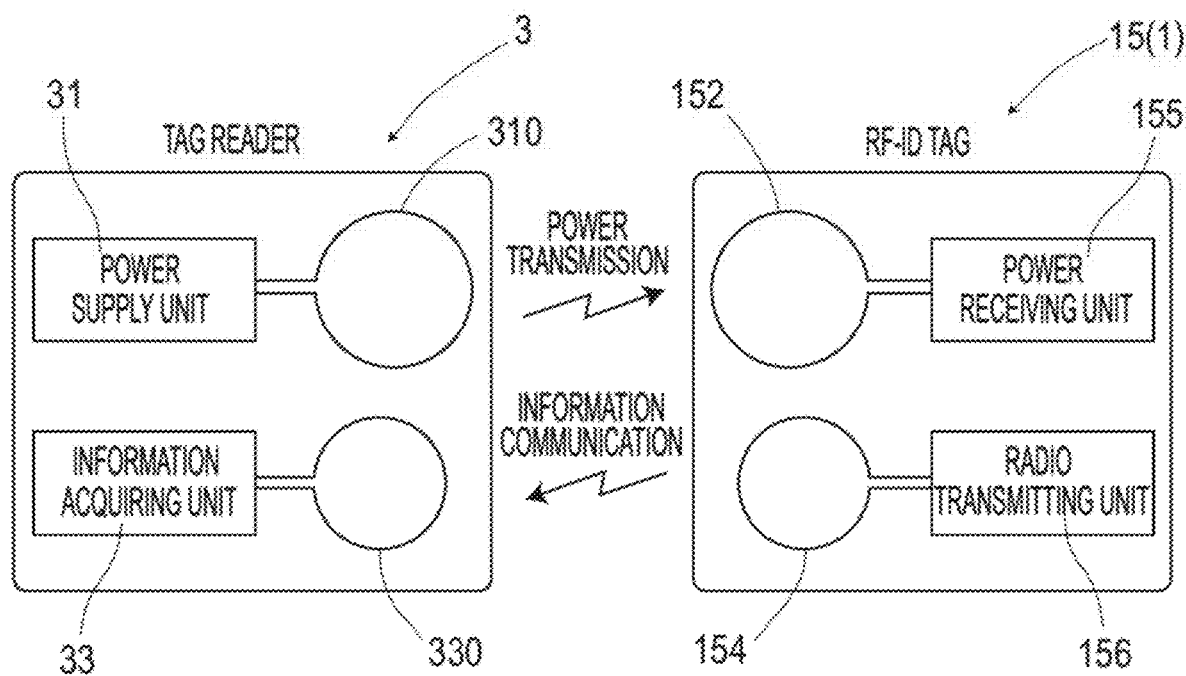

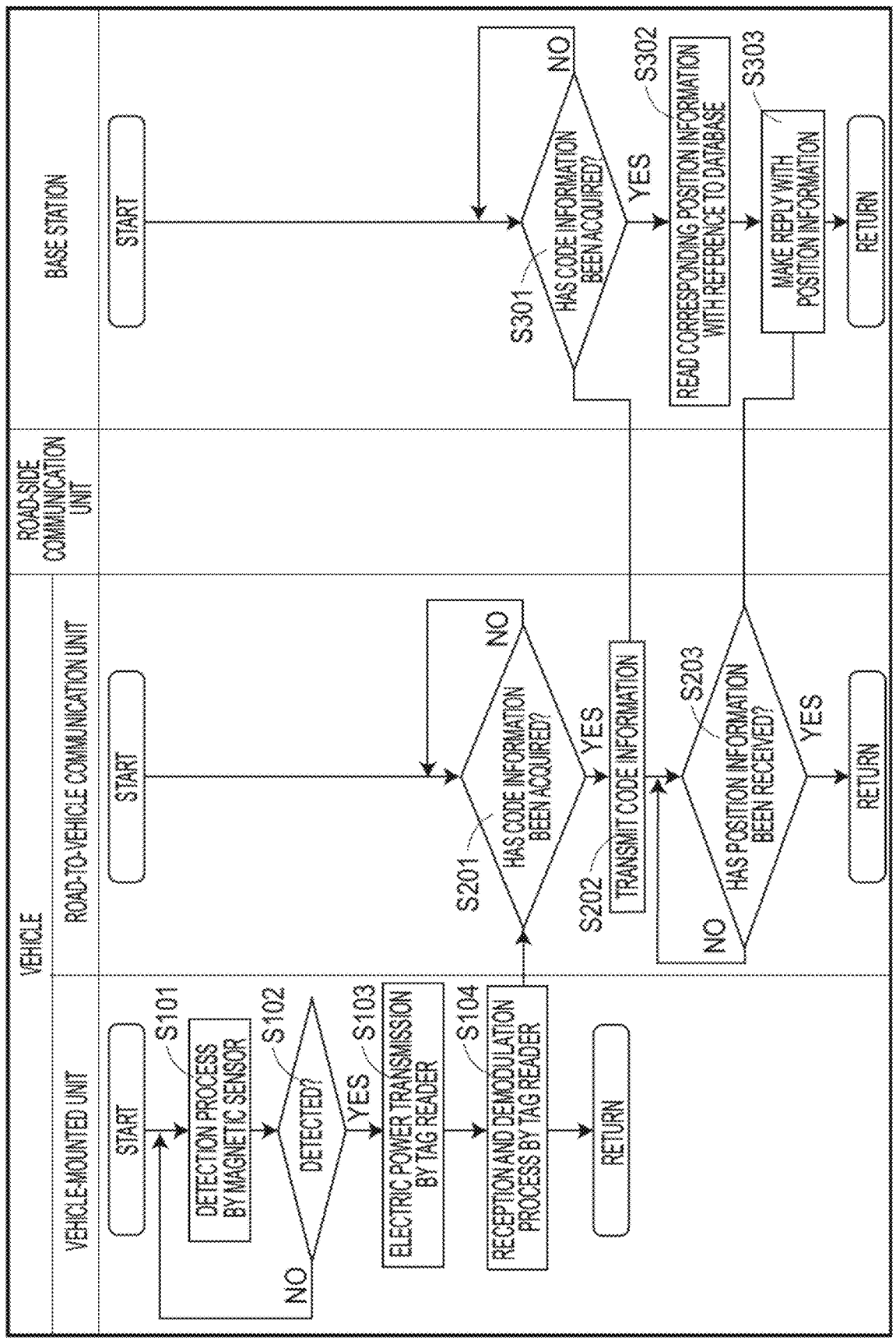
[FIG. 8]

[FIG. 9]
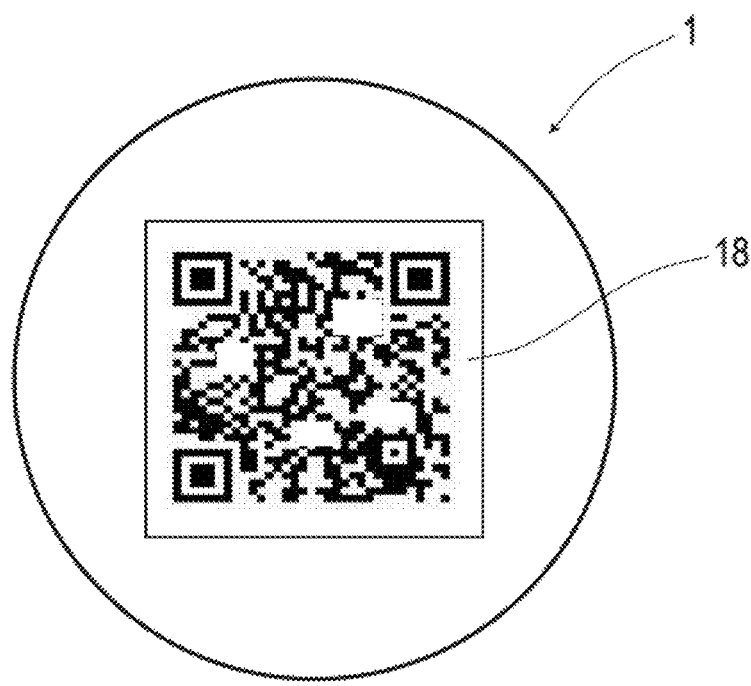

[FIG. 10]
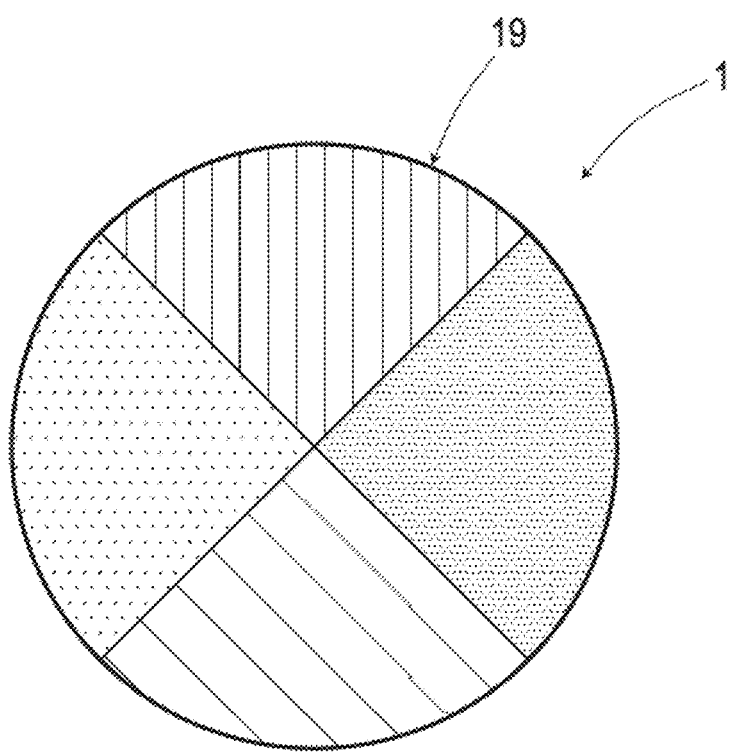

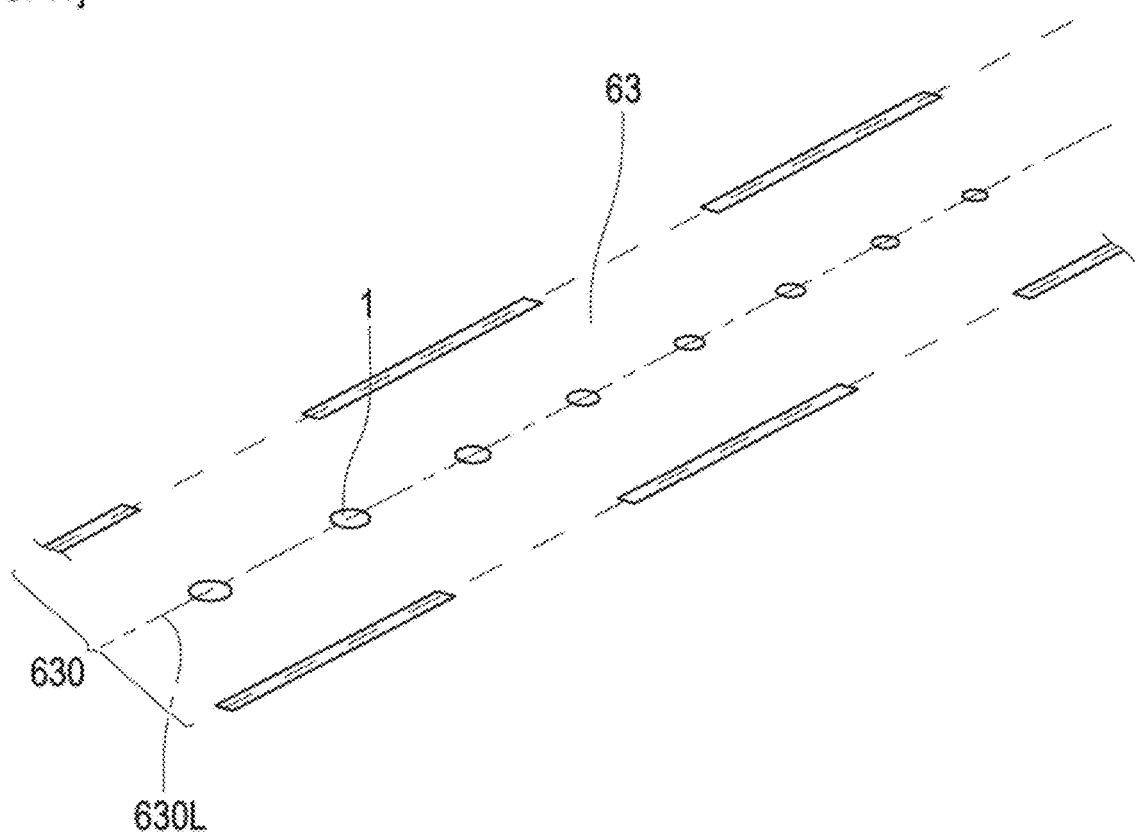
[FIG. 11]

[FIG. 12]
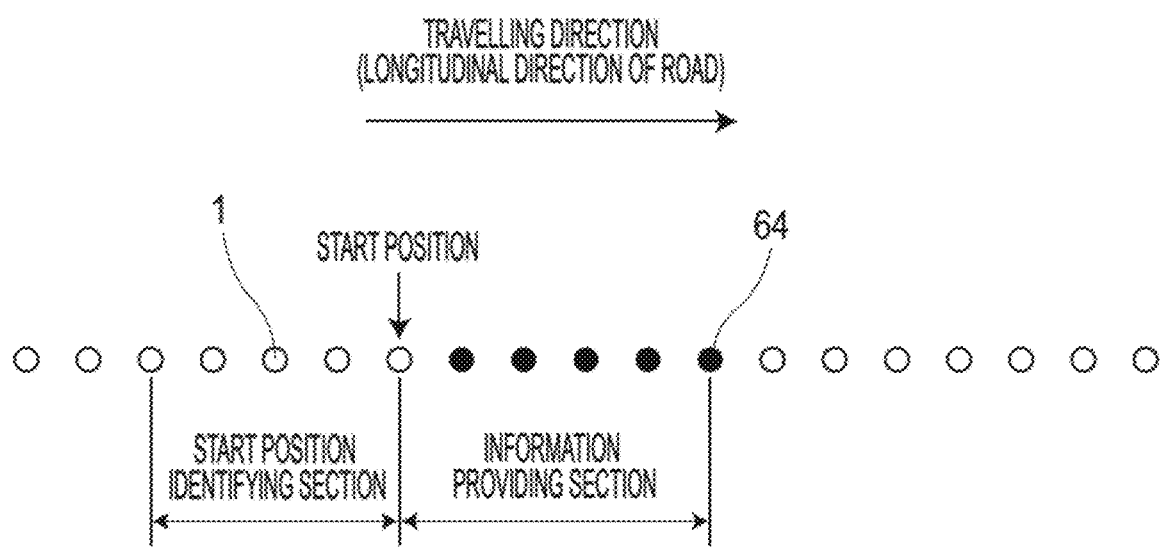

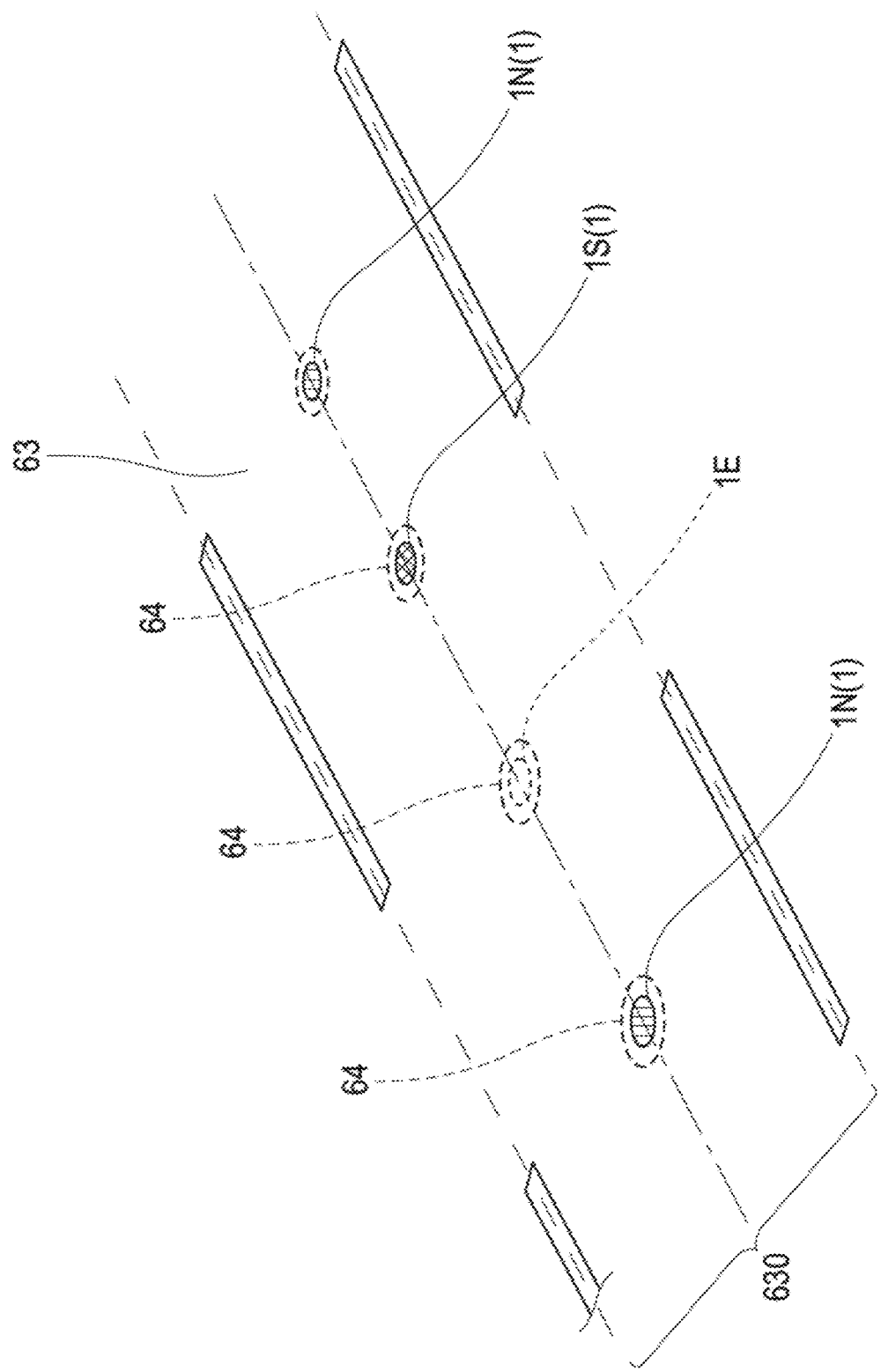
[FIG. 13]

[FIG. 14]
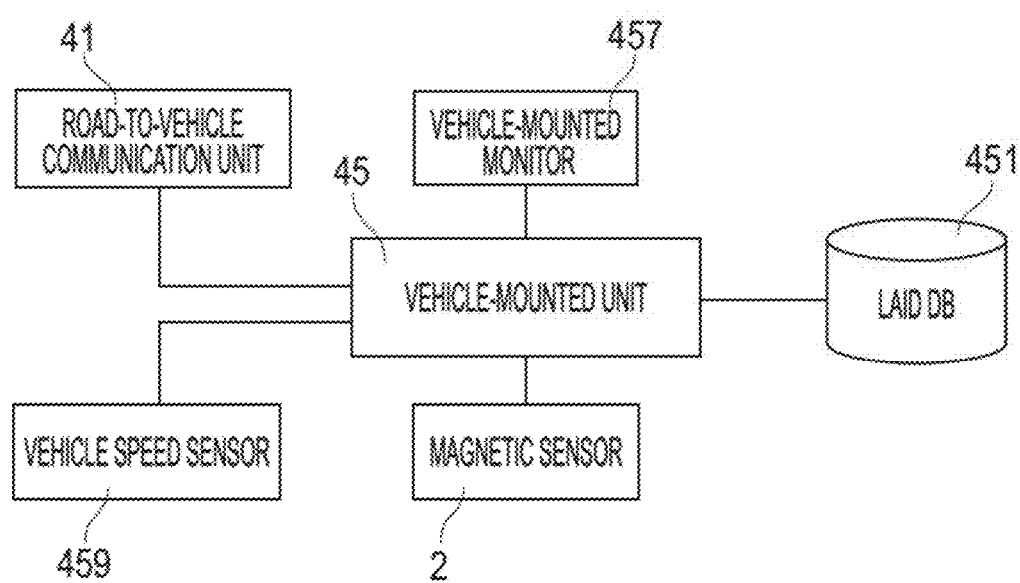

[FIG. 15]
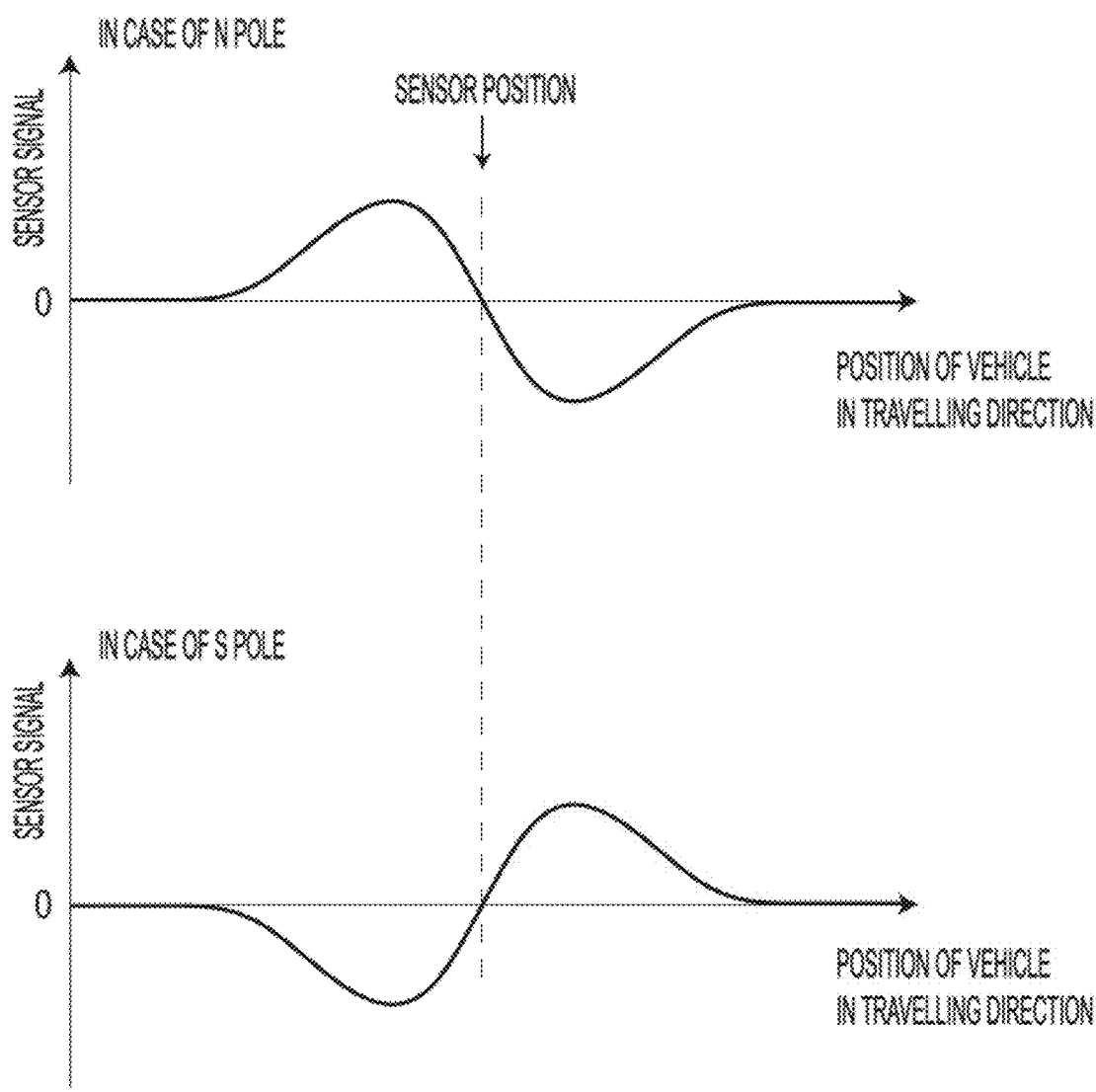

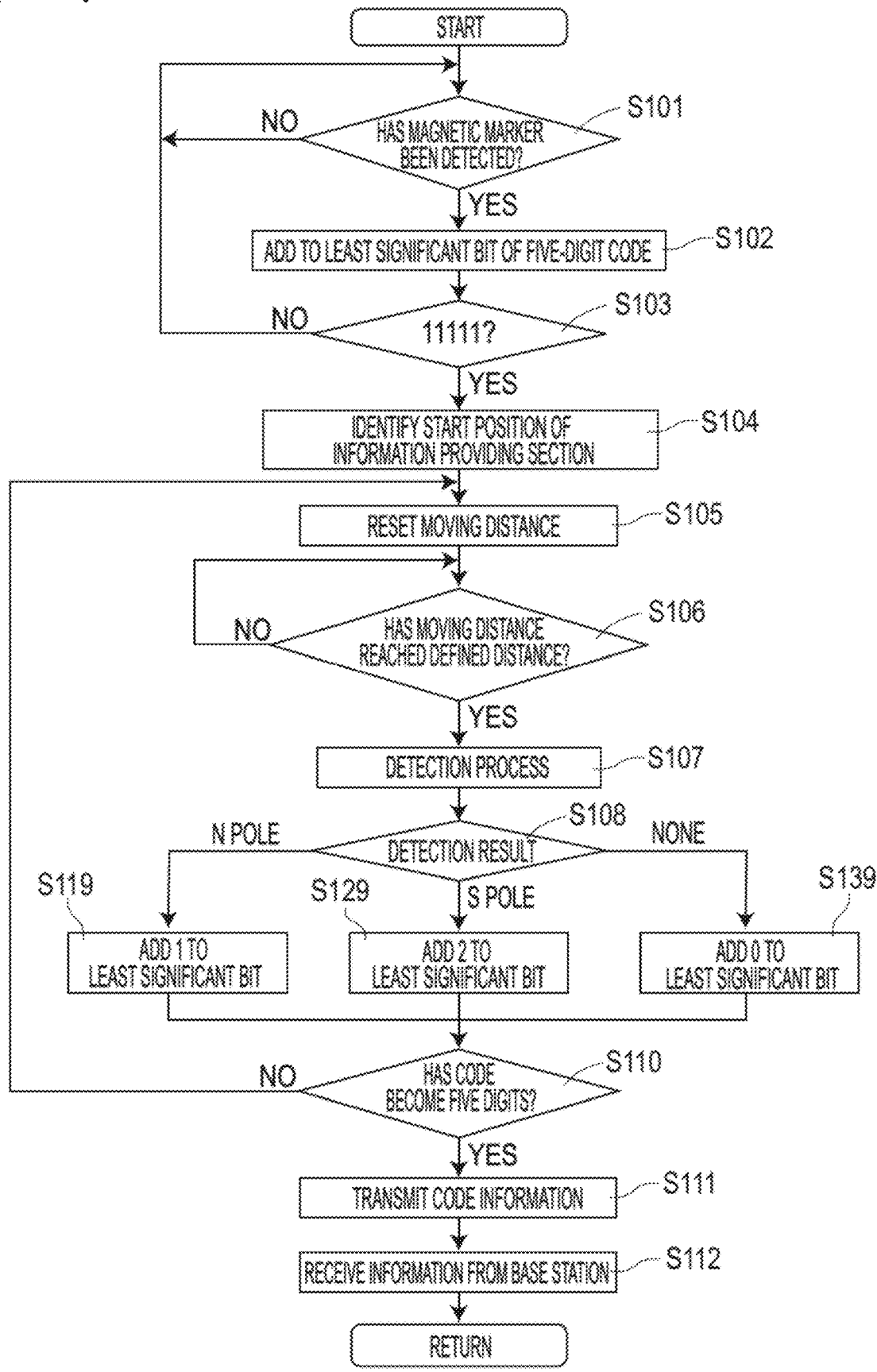
[FIG. 16]

[FIG. 17]
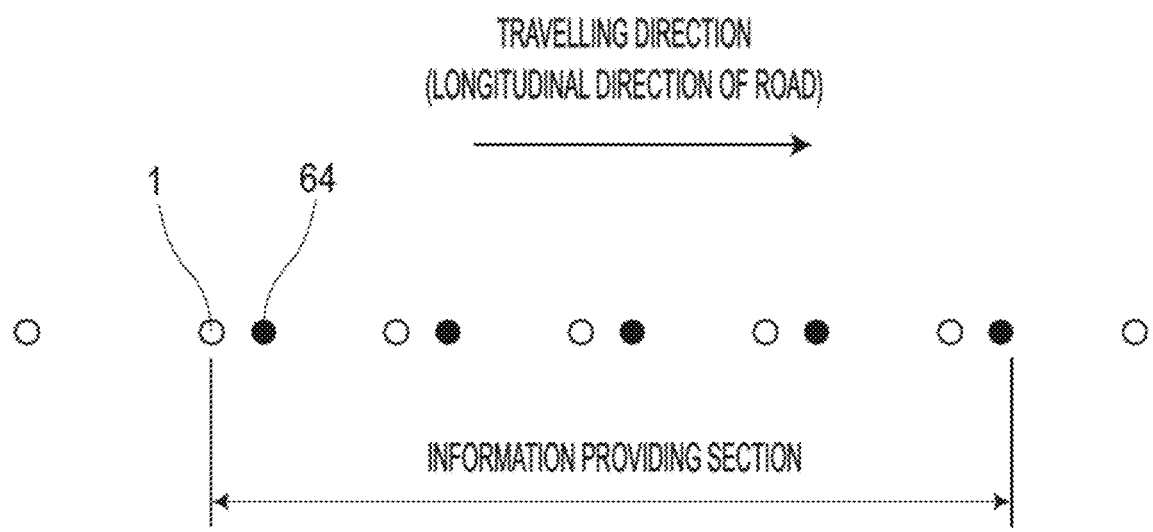

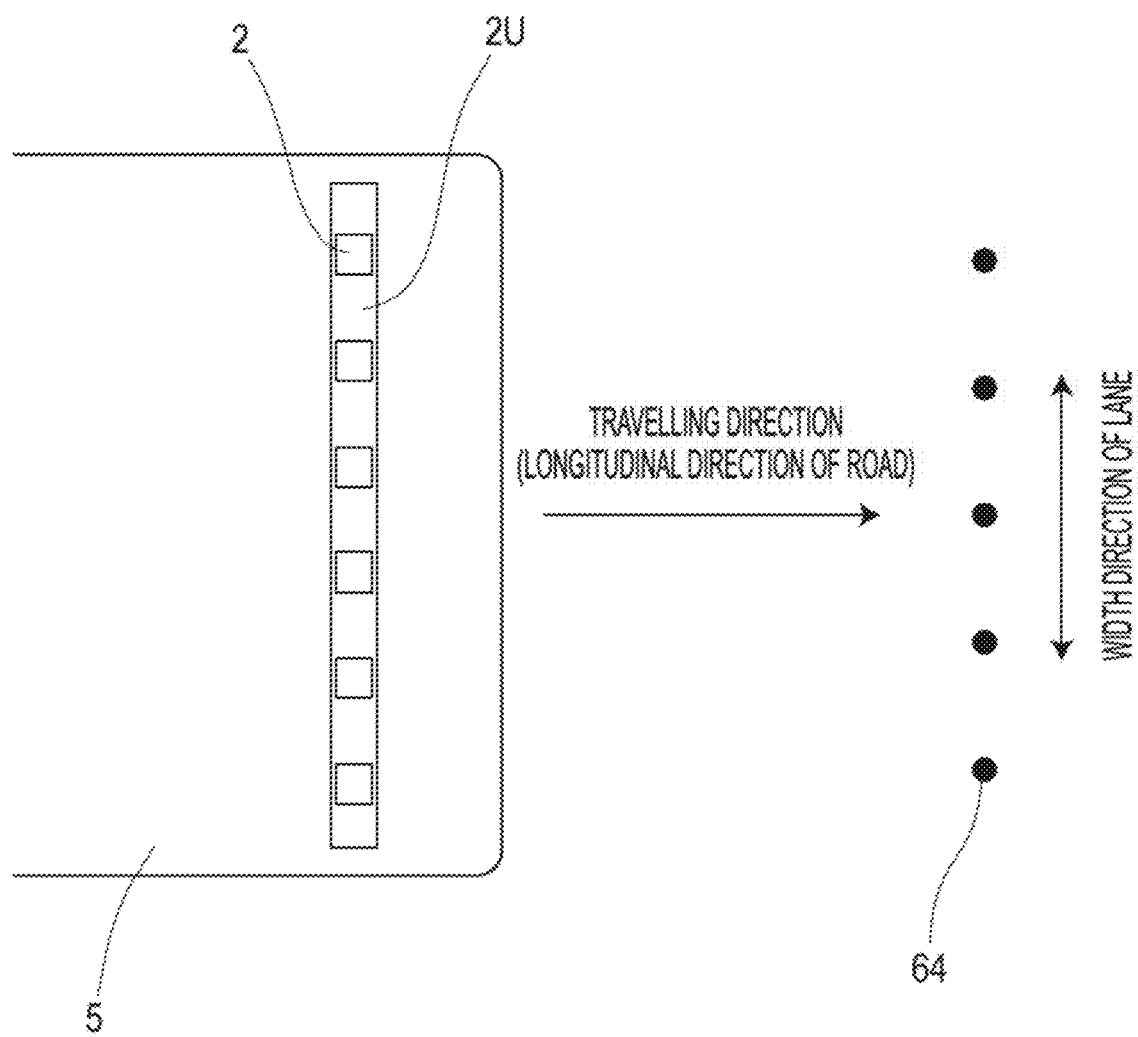
[FIG. 18]

[FIG. 19]
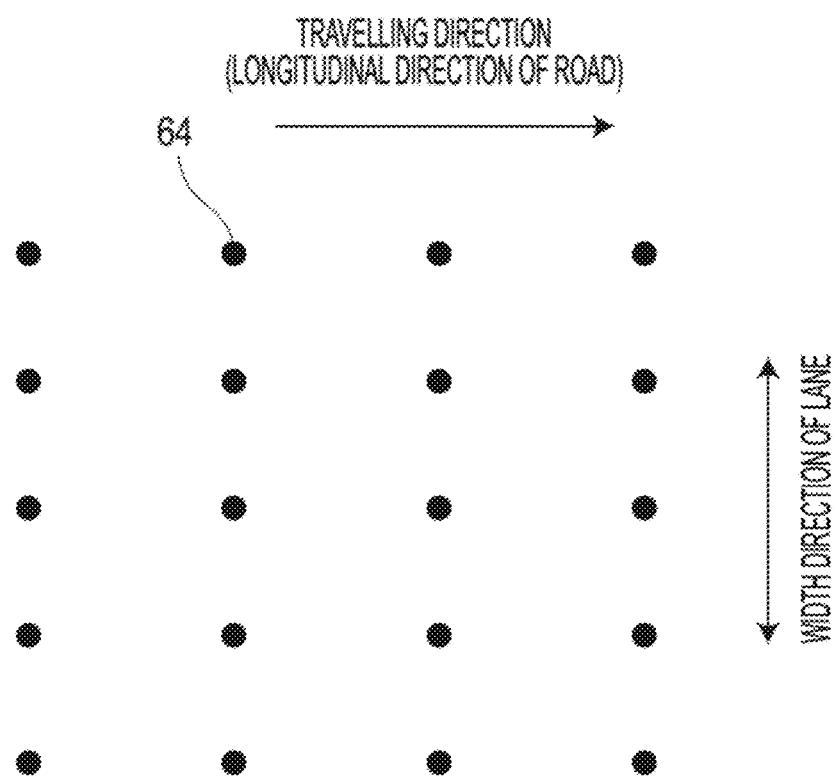

DRIVING ASSISTANCE SYSTEM

CROSS-REFERENCE TO RELATED APPLICATIONS

This application is a National Stage Application based on PCT/JP2017/013346, filed 30 Mar. 2017, and claims priority to Japanese Patent Application No. 2016-090608 on 28 Apr. 2016, the entire contents of which being incorporated herein by reference.

TECHNICAL FIELD

The present invention relates to a driving assistance system which provides information to a vehicle side by using magnetic markers laid on a road.

BACKGROUND ART

Conventionally, a magnetic marker to be laid on a road so as to be detectable by a magnetic sensor on a vehicle side has been known (for example, refer to Patent Literature 1). By using the magnetic marker, for example, there is a possibility that various driving assists using the magnetic markers laid along a lane, such as automatic steering control and lane departure warning, as well as automatic driving can be achieved.

CITATION LIST

Patent Literature

Patent Literature 1: Japanese Unexamined Patent Application Publication No. 2005-202478

SUMMARY OF INVENTION

Technical Problem

However, there is a problem in which information that can be acquired by detection of the magnetic marker is information about the presence or absence of the magnetic marker, a lateral shift amount in a width direction of a vehicle with respect to the magnetic marker, whether the magnetic polarity is the N pole or the S pole, and so forth and the amount and type of information that can be acquired from a magnetic marker side are not sufficient.

The present invention was made in view of the above-described conventional problem to provide a driving assistance system capable of providing more pieces of information to a vehicle side by using magnetic markers.

Solution to Problem

The present invention resides in a driving assistance system comprising:
magnetic markers laid on a travelling road so as to be magnetically detectable and also be able to provide code information to a vehicle side;
a vehicle configured to be able to magnetically detect the magnetic markers and also read the code information; and
a base station configured to make a reply with corresponding information when receiving the code information from the vehicle reading the code information.

Advantageous Effects of Invention

The vehicle in the driving assistance system of the present invention transmits the code information read from the magnetic marker to the base station, and thereby can receive a reply with the corresponding information. According to this driving assistance system, more pieces of information can be provided to a vehicle side by using the magnetic markers.

BRIEF DESCRIPTION OF DRAWINGS

FIG. 1 is a descriptive diagram of a driving assistance system in a first embodiment.
FIG. 2 is a descriptive diagram depicting a magnetic marker and a vehicle in the first embodiment.
FIG. 3 depicts an upper surface view and a side surface view of the magnetic marker in the first embodiment.
FIG. 4 is a front view depicting an RFID tag in the first embodiment.
FIG. 5 is a graph depicting a magnetic field distribution of the magnetic marker in a vertical direction in the first embodiment.
FIG. 6 is a block diagram depicting electrical configuration of a magnetic sensor in the first embodiment.
FIG. 7 is a block diagram depicting electrical configuration of the RFID tag and a tag reader in the first embodiment.
FIG. 8 is a flow diagram depicting a flow of system operation in the first embodiment.
FIG. 9 is a front view of the magnetic marker in a second embodiment.
FIG. 10 is a front view of the magnetic marker in the second embodiment.
FIG. 11 is a descriptive diagram depicting a lane where the magnetic markers are laid in a third embodiment.
FIG. 12 is a descriptive diagram depicting a start position identifying section and an information providing section in the third embodiment.
FIG. 13 is a descriptive diagram of a laying mode of the magnetic markers in the third embodiment.
FIG. 14 is a descriptive diagram depicting electrical configuration of a system on a vehicle side in the third embodiment.
FIG. 15 is a graph depicting changes of a sensor signal passing through the magnetic marker in the third embodiment.
FIG. 16 is a flow diagram depicting a flow of system operation on the vehicle side in the third embodiment.
FIG. 17 is a diagram depicting the configuration of another information providing section in the third embodiment.
FIG. 18 is a diagram depicting an example in which marker laying locations are placed in a vehicle-width direction in the third embodiment.
FIG. 19 is a diagram depicting an example in which the marker laying locations are two-dimensionally placed in the third embodiment.

DESCRIPTION OF EMBODIMENT

Suitable aspects of the present invention are described.
The travelling road where the magnetic markers are to be laid may be a public road or a passage in premises such as a shopping center. Furthermore, the travelling road may be a passage in a drive-in multistory parking facility or drive-in underground parking facility in a building such as a shopping center.
The magnetic markers preferably each include a magnetism generating unit which generates a peripheral magnetic field and also an information providing unit which provides the code information to the vehicle side.

As the information providing unit, examples include one which provides the code information via a radio wave and one which optically provides the code information via an image or light.

The information providing unit may be a radio tag held by the magnetic marker.

In wireless communication, an influence is relatively small even if snow accumulation, soil, and so forth are attached or the like on the surface side of the magnetic marker, and information transmission can be made. Note that on the vehicle side, a function of receiving radio waves transmitted from the magnetic marker and demodulating information is preferably provided.

As a mode of holding the radio tag by the magnetic marker, examples include a mode in which a sheet-shaped radio tag is placed on a front surface side or a back surface side of the magnetic marker and a mode in which the radio tag is placed on a side surface side of the magnetic marker. Furthermore, the mode may be such that while part of the radio tag is buried inside the magnetic marker, a radio antenna is placed on the front surface side, the back surface side, or the side surface side of the magnetic marker. Still further, the mode may be such that the entire radio tag is buried and held in the magnetic marker. Note that the front surface side of the magnetic marker is a side oriented upward at the time of laying and the back surface side of the magnetic marker is a side facing the road surface of the travelling road at the time of laying.

The magnetic marker is preferably such that the radio tag is a radio tag using a frequency band of 710 MHz to 960 MHz. With the radio tag using this frequency band, small-sized and robust wireless communication can be achieved.

The magnetism generating unit preferably has a magnet molded including magnetic powder as a magnetism generation source. For example, when electric power required for operation of the radio tag or the like is wirelessly transmitted by electromagnetic induction or the like, if eddy current occurs in the magnetism generating unit, efficiency of electric power transmission is significantly impaired. With the magnet made by molding the magnetic powder, electrical internal resistance is high, and therefore the eddy current can be reduced and electric power can be efficiently transmitted. Furthermore, for example, if a bond magnet made by mixing magnetic powder into a binder made of a high-polymer material such as rubber or plastic and molding the resultant material is adopted as the magnetism generating unit, a high-frequency loss can be reduced, and therefore affinity with the radio tag using a high-frequency band is favorable.

The information providing unit may be a pictorially readable pattern formed on a surface of the magnetic marker.

As a pictorially readable pattern, examples include various pictorially identifiable patterns such as pictorial codes such as a barcode and QR code (registered trademark) and also a type of color, multi-colored pattern, texture (figure), character, and signs. Preferably provided on the vehicle side is an information acquiring unit which pictorially takes an image of the pattern formed on the surface of the magnetic marker and pictorially reads information represented by that pattern.

It is preferable that marker laying locations where there is a possibility of laying the magnetic markers are one-dimensionally or two-dimensionally set on the travelling road, any of a plurality of laying modes including a mode in which the magnetic marker is not laid is alternatively selected at each of the marker laying locations, and the code information can be provided to the vehicle side by a combination of the laying modes of the magnetic markers at the plurality of marker laying locations.

In this case, the code information can be provided by the combination of laying modes of the magnetic markers at the plurality of marker laying locations.

The laying modes of the magnetic markers preferably include a mode in which the magnetic marker is laid so that an N pole is positioned on a surface side and a mode in which the magnetic marker is laid so that an S pole is positioned on the surface side.

In this case, three modes with the N pole, the S pole, and without laying can be set as the laying modes, and the marker laying location at one location can be represented by three values. Compared with the case in which representation is made by using two values of the N pole and the S pole, the number of magnetic markers required to provide the same information amount can be decreased.

The vehicle preferably includes a laying location identifying unit which positionally identifies the plurality of marker laying locations and an information acquiring unit which acquires the code information by detecting the laying modes of the magnetic markers as for the plurality of marker laying locations.

If the marker laying locations are identifiable on the vehicle side, the mode in which the magnetic marker is not laid can be detected with high reliability.

The code information may be information represented by a distance between two of the magnetic markers arrayed in a vehicle width direction or a longitudinal direction of the travelling road.

For example, as for the magnetic markers one-dimensionally arrayed in the longitudinal direction, the code information may be represented by an increase or decrease of the distance between two magnetic markers. For example, the information can be represented by a combination of an increase, decrease, and non-changing of the distance, or the like. The information can also be represented by the magnitude itself of a difference when the distance is increased or decreased or a combination of magnitudes.

As two magnetic markers at the above-described distance, adjacent two magnetic markers in an arrayed direction may be used, or two magnetic markers positioned with intervention of a predetermined number of other magnetic markers in the arrayed direction, such as every another one, every two other ones, or every three other ones.

The code information may be information represented by a magnetic strength of each of the magnetic markers acting on the vehicle side.

As with the case of the distance, for example, as for the adjacent magnetic markers, the information can be represented by a combination of an increase in magnetic strength, decrease in magnetic strength, and non-changing in magnetic strength, or the like. Also, for example, the information can also be represented by the magnetic strength itself with which the magnetic markers act on.

The code information may be information represented by placement of the magnetic markers.

The placement includes a placement shape as a shape formed by a plurality of magnetic markers described above and also the number of laid magnetic markers described above. As a placement shape, examples include shapes in which the plurality of magnetic markers described above are placed in one lateral line, one vertical line, two lateral lines, two vertical lines, a triangle, a diamond, and so forth. It is also preferable, for example, while the marker laying locations are one-dimensionally provided along the longitudinal direction of the travelling road, the number of magnetic markers laterally laid at each marker laying location is changed, and the information is represented by a combination of these numbers.

It is preferable that the vehicle includes a positioning unit which positions an absolute position and an assist information presenting unit which presents driving assist information using an absolute position where the vehicle is located to a driver's side, and the information with which the reply is made by the base station to the vehicle includes position information with which the absolute position where the vehicle is located can be identified.

In this case, even if the absolute position cannot be positioned or the accuracy of positioning becomes insufficient, the absolute position can be identified by the information received from the base station. This can achieve a robust system which can accurately provide the driving assist information to the driver's side, irrespective of whether the situation allows positioning by the positioning unit. Note that as the positioning unit, an example is one using GPS. In the case of GPS, the above-described configuration is effective because situations often occur in which positioning becomes impossible or accuracy becomes insufficient in accordance with the situation of receiving satellite radio waves.

It can be thought that the information with which the reply is made from the base station can be used for such as a driving assist by presenting the information itself or the information processed to the driver and a driving assist by vehicle control or the like using that information. As a mode of presenting the information or the like to the driver, an example is a mode of presentation by using a display, loudspeaker, alarm, buzzer, vibrator, or the like. As vehicle control, examples include control for achieving automatic braking, control for achieving automatic steering, and control for automatically controlling the engine throttle.

EMBODIMENTS

First Embodiment

The present example is an example regarding a driving assistance system 1A using the magnetic markers 1. Details of this are described with reference to FIG. 1 to FIG. 8.

The driving assistance system 1A for vehicles is a system by a combination of the magnetic markers 1 laid on a road surface 63 of a travelling road for a vehicle 5, the vehicle 5 including a vehicle-mounted unit 2A including a magnetic sensor 2 and so forth and also a road-to-vehicle communication unit 41, and a base station 6 capable of communicating with the vehicle 5 side via road-to-vehicle communication, as in FIG. 1 and FIG. 2. In the driving assistance system 1A, wireless communication between the vehicle 5 side and the base station 6 can be made via a communication unit 60 set on a road side. Note that the communication unit 60 is communicably connected to the base station 6 via a dedicated communication line or Internet line.

An output signal of the vehicle-mounted unit 2A (FIG. 2) attached to a vehicle body floor 50 corresponding to the bottom surface of the vehicle 5 is inputted to, for example, an ECU or the like not depicted on the vehicle 5 side. Information such as an indication of detection of the magnetic marker 1 and a lateral shift amount, which is a deviation in a vehicle width direction with respect to the magnetic marker 1, can be used for various driving assists, such as automatic steering control for keeping the lane, lane departure warning, route navigation, traffic information display, warning, and automatic driving.

Furthermore, the vehicle 5 configuring the driving assistance system 1A of the present example can acquire code information from the magnetic marker 1. By transmitting the code information to the base station 6, the vehicle 5 can acquire two-dimensional position information as information corresponding to that code information. By using the two-dimensional position information that can be acquired from the base station 6, for example, a navigation system or the like can be configured.

In the following, the configuration of the driving assistance system 1A of the present example is described.

The base station 6 is a server apparatus connected to the dedicated line or Internet line. The base station 6 as a server apparatus is configured to include a database having stored therein an enormous amount of position information linked with code information. When receiving the code information from the vehicle 5 side as described above, the base station 6 reads position information linked with that code information, and replies to the vehicle 5 as a transmission source. Note that in place of the present example, the database function of the base station 6 may be provided to the communication unit 60 set on the road side in a distributed manner. As a database to be provided to the communication unit 60 in a distributed manner, what is preferable is a small-sized one corresponding to code information that has a possibility of being acquired by the vehicle 5 travelling in a range where that communication unit 60 can perform wireless communication.

As depicted in FIG. 3, the magnetic marker 1 is a marker which has a flat circular shape having a diameter of 100 mm and a maximum thickness of approximately 2.0 mm and can be bonded and joined to the road surface 63. In this magnetic marker 1, a sheet-shaped RFID tag (Radio Frequency IDentification, radio tag) 15 is laminated on the surface side. The magnetic marker 1 of the present example including the RFID tag 15 can be magnetically detected on the vehicle 5 side and also can provide code information to the vehicle 5 side without depending on a magnetic method.

The magnetic marker 1 is a marker made by covering both front and back surface sides of a flat magnet sheet 11 having a diameter of 100 mm and a thickness of 1 mm with a resin mold 12. The magnet sheet 11 serving as one example of the magnetism generating unit is a sheet of an isotropic ferrite rubber magnet having a maximum energy product (BHmax) of 6.4 kJ/m$^3$. This magnet sheet 11 is a bond magnet made by mixing rubber as a binder into a raw material, magnetic powder of iron oxide, to form a sheet shape.

The sheet-shaped RFID tag 15 having a thickness of 0.5 mm is laminated and placed on the surface of the magnet sheet 11. The resin mold 12 on the front surface side covers the surface side of the magnet sheet 11 where the RFID tag 15 is laminated and placed. The thickness of the resin mold 12 on the front surface side of the magnetic marker 1 is 0.3 mm, and the thickness on the back surface side corresponding to an installation surface of the magnetic marker 1 is 0.2 mm. In the magnetic marker 1, the portion where the RFID tag 15 is placed has a maximum thickness, and the maximum thickness is 2.0 mm including the thickness of the resin mold 12.

Note that it is also preferable that a sheet having a diameter of 100 mm and a thickness of 0.5 mm to 1.0 mm provided with a rectangular placement hole corresponding to the RFID tag 15 is laminated and placed on the surface of the magnet sheet 11 and the RFID tag 15 is positioned at that placement hole. In this case, the thickness of the placement portion of the RFID tag 15 can be made equivalent to or thinner than the other portions. This can reduce loads acting on the RFID tag 15 when the magnetic marker 1 is stepped on by the tire of the vehicle 5 or the like.

Installation of the magnetic marker 1 onto the road surface 63 is performed by, for example, bonding and fixing by a bonding material. Note that the resin mold may be provided also to the outer circumferential side surface of the magnetic marker 1. Furthermore, by laminating a glass cloth or the like on the surface of the magnet sheet 11 where the RFID tag 15 is laminated and impregnating the glass cloth with resin, a glass-fiber-reinforced resin mold may be formed.

As in FIG. 3 and FIG. 4, the RFID tag 15 serving as one example of an information providing unit is an electronic component having an IC chip 157 implemented on the surface of a tag sheet 150 as a sheet-shaped member. The RFID tag 15 is configured to operate by power supplied via wireless transmission from outside and wirelessly transmit code information stored in the IC chip 157.

In particular, the RFID tag 15 of the present example is a radio tag using a 900-MHz band. In this frequency band, the size of the RFID tag 15 can be easily reduced, and robust wireless communication can be achieved due to high radio-wave transmission capability. Note that the magnet sheet 11 as a bond magnet has a characteristic of a small high-frequency loss. Therefore, this magnet sheet 11 has a small degree of attenuating radio waves in the 900-MHz band transmitted by the RFID tag 15, and has a high affinity for the RFID tag 15.

The tag sheet 150 is a sheet-shaped member cut out from a PET film. On the surface of the tag sheet 150, a loop coil pattern 151 and an antenna pattern 153, which are printed patterns in conductive ink such as silver paste, are formed. The loop coil pattern 151 and the antenna pattern 153 each assume a substantially annular shape with a notch at one location. In this notched portion, a chip placement area (omitted in the drawing) is formed for placing the IC chip 157. When the IC chip 157 is joined to the tag sheet 150, each of the patterns 151 and 153 is electrically connected to the IC chip 157.

The loop coil pattern 151 is a pattern forming a power receiving coil 152. By electromagnetic induction from outside, an exciting current occurs in this loop coil pattern 151. The antenna pattern 153 is a pattern forming a transmission antenna 154 for wirelessly transmitting information. The power receiving coil 152 formed of the loop coil pattern 151 and the transmission antenna 154 formed of the antenna pattern 153 each have sensitivity to a vertical direction of its formation surface. The specifications of this sensitivity are suitable for communication with the vehicle-mounted unit 2A attached to the vehicle body floor 50 of the vehicle 5 and so forth. Note that as a conductive ink for printing each of the patterns 151 and 153, silver paste as well as graphite paste, silver chloride paste, copper paste, nickel paste, and so forth can be used. Furthermore, each of the patterns 151 and 153 can be formed by copper etching or the like.

The IC chip 157 is an electronic component having a semiconductor element 158 including a ROM, RAM, and so forth as memory unit implemented on the surface of a sheet-shaped base material 159. The RFID tag 15 is fabricated by affixing this IC chip 157 to the surface of the above-described tag sheet 150. For affixing the IC chip 157 of an interposer type provided with an electrode not depicted, any of various joining methods can be adopted, such as a conductive bonding material, ultrasonic bonding, and caulked joint. Note that the electrical configuration of the RFID tag 15 will be described further below with reference to a block diagram of FIG. 6.

As the tag sheet 150 of the RFID tag 15 and the base material 159 of the IC chip 157, a resin film made of polyethylene (PE), polyethylene terephthalate (PET), polypropylene (PP), or the like, paper, or the like can be adopted. Furthermore, the above-described IC chip 157 may be a semiconductor element itself, or a chip having a semiconductor element packaged by plastic resin or the like.

Here, shape specifications and magnetic specifications of the magnet sheet 11 included in the magnetic marker 1 of the present example are partially depicted in Table 1.

TABLE 1

| Magnet type | Ferrite rubber magnet |
|---|---|
| Outer diameter | φ 100 mm |
| Thickness | 1.0 mm (except resin mold) |
| Magnetic flux density Gs of the surface | 1 mT |

A magnetic field distribution in a vertical direction of the magnetic marker 1 is as depicted in FIG. 5. The drawing is a semilogarithmic graph depicting the result of a computer simulation performed by the axisymmetric three-dimensional magneto-static analysis using the finite-element method. Note that, in performing this computer simulation, a simulation program with its simulation accuracy confirmed in advance by a demonstration experiment is used. Furthermore, as for part of data depicted in the drawing, it has been confirmed by a demonstration experiment that simulation values are correct.

In FIG. 5, a logarithmic scale of the magnetic flux density of magnetism acting in the vertical direction is set on the vertical axis and the height in the vertical direction with reference to the surface of the magnetic marker 1 (height from the surface of the marker) is set on the horizontal axis. In the drawing, the magnetic flux density when the height from the surface of the marker=0 mm is the "magnetic flux density Gs of the surface" in Table 1. In this magnetic marker 1, in a range of 100 mm to 250 mm assumed as attachment heights of the magnetic sensor 2, the magnetic flux density equal to or larger than 8 microtesla is ensured.

Next, the vehicle 5, which is on a side of detecting the magnetic marker 1 and so forth, is described. This vehicle 5 includes the road-to-vehicle communication unit 41 which performs communication with a base station 6 and a vehicle-mounted unit 2A which performs detection of the magnetic marker 1 and so forth (refer to FIG. 2).

The road-to-vehicle communication unit 41 is a communication unit which performs communication with the base station 6 via the communication unit 60 (refer to FIG. 1) set on the road side.

The vehicle-mounted unit 2A is configured to include the magnetic sensor 2 of FIG. 6 which magnetically detects the magnetic marker 1 and a tag reader 3 of FIG. 7 which acquire information from the magnetic marker 1. The vehicle-mounted unit 2A is attached to the vehicle body floor 50 forming the bottom surface of the vehicle 5 so as to be able to, for example, detect the magnetic marker 1 laid on the road surface 63. The attachment height of the vehicle-mounted unit 2A varies depending on the vehicle type, in a range of 100 mm to 250 mm. In the following, the magnetic sensor 2 and the tag reader 3 configuring the vehicle-mounted unit 2A are sequentially described.

(Magnetic Sensor)

The magnetic sensor 2 serving as one example of a magnetism detecting unit is a MI (Magnet Impedance) sensor of one chip, with a MI element 21 and a drive circuit integrated together, as depicted in the block diagram of FIG. 6. The MI element 21 is an element including an amorphous wire (one example of a magneto-sensitive body) 211 made of a CoFeSiB-based alloy with approximately zero magnetostriction and a pickup coil 213 wound around the periphery of this amorphous wire 211. The magnetic sensor 2 measures an induced voltage of the pickup coil 213 when a pulse current is applied to the amorphous wire 211 to detect magnetism acting on the amorphous wire 211 as the magneto-sensitive body.

Note that the MI element 21 has detection sensitivity to an axial direction of the amorphous wire 211 as the magneto-sensitive body. In the vehicle 5, the magnetic sensor 2 is set so that the amorphous wire 211 is along the travelling direction.

The drive circuit is configured to include a pulse circuit 23 which supplies a pulse current to the amorphous wire 211 and a signal processing circuit 25 which samples and outputs the induced voltage of the pickup coil 213 at a predetermined timing. The pulse circuit 23 is a circuit including a pulse generator 231 which generates a pulse signal as a source of the pulse current. The signal processing circuit 25 is a circuit which retrieves the induced voltage of the pickup coil 213 via a synchronous detection 251 which is opened and closed in step with the pulse signal and performs amplification at a predetermined amplification factor by an amplifier 253. The signal amplified by this signal processing circuit 25 is outputted to outside as a sensor signal.

Specifications of this magnetic sensor 2 are partially depicted in Table 2.

TABLE 2

| Measurement range | ±0.6 mT |
| --- | --- |
| Magnetic flux resolution | 0.02 µT |
| Sampling period | 3 kHz |

The magnetic sensor 2 is a high-sensitivity sensor with a measurement range of magnetic flux density of ±0.6 millitesla and a magnetic flux resolution within the measurement range of 0.02 microtesla. This high sensitivity is achieved by the MI element 21 using an MI effect in which the impedance of the amorphous wire 211 changes with sensibility in accordance with the outer magnetic field. According to the magnetic sensor 2 with a magnetic flux resolution of 0.02 microtesla (refer to Table 2), it is possible to reliably detect the magnetic marker 1 acting with magnetism with at least a magnetic flux density of 8 microtesla (refer to FIG. 5) in 100 mm to 250 mm, which is in an assumed range of the attachment height. Furthermore, this magnetic sensor 2 can perform high-speed sampling at a period of 3 kHz, and also supports high-speed travelling of the vehicle.

(Tag Reader)

The tag reader 3 serving as one example of an information acquiring unit is configured to include, as in FIG. 7, a power supply unit 31 which supplies power to the RFID tag 15 included in the magnetic marker 1 and an information acquiring unit 33 which acquires code information wirelessly transmitted by the RFID tag 15. The power supply unit 31 is an electronic circuit which supplies an electric current to the loop coil 310 to generate a magnetic field and transmits electric power by electromagnetic induction. The information acquiring unit 33 is an electronic circuit which receives radio waves transmitted by the RFID tag 15 by using a loop antenna 330 and retrieves code information by demodulation.

With an exciting current generated in the power receiving coil 152 on the RFID tag 15 side by electromagnetic induction due to the magnetic field generated by the loop coil 310, the tag reader 3 transmits electric power and causes a power receiving unit 155 on the RFID tag 15 side to store electric power. On the RFID tag 15 side, upon reception of supply of electric power from the power receiving unit 155, a wireless transmitting unit 156 operates, and transmits code information and so forth to the vehicle 5 side via the transmission antenna 154. Also, a dedicated work vehicle having vehicle-mounted thereon a reader/writer including a data write function can write new code information to the RAM and rewrite data.

Next, the operation of the driving assistance system 1A is described with reference to the flow diagram of FIG. 8.

During travelling of the vehicle 5, a process of detecting the magnetic marker 1 is repeatedly performed by using the magnetic sensor 2 of the vehicle-mounted unit 2A (S101). When the magnetic marker 1 is detected by the magnetic sensor 2 (S102: YES), the vehicle-mounted unit 2A causes the tag reader 3 to perform electric power transmission, thereby supplying operating power to the RFID tag 15 of the magnetic marker 1 (S103). The vehicle-mounted unit 2A causes the tag reader 3 to start a reception and demodulation process in synchronization with wireless transmission started in response to the operation of the RFID tag 15 (S104), and acquires code information transmitted by the RFID tag 15.

When the code information is acquired (S201: YES), the road-to-vehicle communication unit 41 transmits that code information to the base station 6 via wireless communication with the communication unit 60 (FIG. 1) set on the road side (S202). The road-to-vehicle communication unit 41 waits until receiving a reply with position information corresponding to that code information from the base station (S203), and ends the communication process in response to reception of the position information (S203: YES). Thereafter, the vehicle-mounted unit 2A waits for acquisition of new code information (S201: NO).

On the base station 6 side, when the code information is received from the vehicle 5 side (S301: YES), reading of position information corresponding to that code information is performed with reference to a database (S302). Then, a reply with the read-out position information is made to the vehicle 5 as the transmission source of the code information (S303). Note that in the driving assistance system 1A, each vehicle 5 is assigned with an identification ID, and the code information received by the base station 6 is linked with that identification ID. On the base station 6 side, the vehicle 5 as the transmission source can be identified by the identification ID linked to the received code information, and a reply with the position information can be made with high reliability to that vehicle 5.

If two-dimensional position information is provided to the vehicle 5 side, for example, accurate position information can be acquired by the vehicle 5 side without depending on the GPS (Global Positioning System) or the like, and a navigation system can be achieved. Also, when the vehicle 5 is positioned midway between the magnetic markers 1 adjacent to each other in the travelling direction of the vehicle 5, it is preferable that the vehicle position is estimated by inertial navigation using measurement values such as a vehicle speed and a yaw rate and an accurate position is acquired every time the vehicle passes through the magnetic marker 1.

Note that a combination of a navigation system having a positioning unit which positions an absolute position by using satellite radio waves received from a GPS satellite and an assist information presenting unit which presents driving assist information to the driver's side by using the positioned absolute position is also effective. The magnetic marker 1 capable of providing position information is preferably laid at a location in a tunnel, between buildings, or the like where reception of GPS satellite radio waves is impossible or liable to be instable. If the position information with which the absolute position of the vehicle 5 can be identified is returned from the base station 6, a poor situation with regard to reception of GPS radio waves can be backed up, and position acquisition accuracy by the navigation system can be improved.

Note that as information to be provided from the base station 6 to the vehicle 5 side, in place of the two-dimensional position information of the present example, the following (1) detailed position information, (2) height information, (3) traffic information, and so forth may be used, for example.

(1) Detailed Position Information

Information about the gradient of a road, the curvature of a road ahead, the type of a lane being traveled, a legal speed limit, and so forth may be included in the position information. With these detailed pieces of information, it is possible to perform, for example, driving assist by calling a driver's attention and vehicle control such as that by making the gear shifted down by one step before a steep downhill or steep curve to make the engine brake effective.

(2) Height Information (Three-Dimensional Position Information)

For example, the magnetic markers 1 may be laid in advance on a passage in a drive-in multistory parking facility or the like in a shopping center or the like, and height information such as a floor number may be provided to the vehicle 5 side. For example, in GPS or the like, it is not easy to identify a floor number inside a building. When the floor number where the vehicle resides is unknown, even if vacant slot information identified with the floor number is provided from an infrastructure side, it is difficult to accurately perform a route guide to that vacant slot. With height information with which the floor number can be identified is present, it is possible to accurately perform a road guide to a vacant slot in a drive-in multistory parking facility.

(3) Traffic Information

Traffic information such as information about intersections, information about branching roads, and information about merging roads may be provided to the vehicle 5 side. For example, the magnetic marker 1 may be set at a feature point on the road (travelling road) such as an intersection, branching road, or merging road, and traffic information about the road shape may be provided from the base station 6. Driving assists using traffic information include presentation of traffic information by a display for calling a driver's attention, a warning sound, or the like and various driving assist controls such as brake control and steering control. For example, if a distance between the stop line of an intersection and the magnetic marker 1 is defined, brake control for stopping at the stop line can be accurately performed. Also, if a distance between the start position of a branching road and the magnetic marker 1 is defined, driving assist control for branching at the branching road can be accurately performed. Note that information about the distances between intersections or branching roads and the magnetic markers 1 may be included in the information provided from the base station 6.

Furthermore, when the base station 6 can collect real-time information such as accidents, incidents, and regulations, these pieces of real-time information can be provided to the vehicle 5 side as traffic information. Note that when the own vehicle has an accident, information about the occurrence of the accident and information about the occurrence position may be transmitted to the base station 6 side. This configuration can quickly address accidents, the accident information can be quickly grasped on the base station 6 side, and development of the information to other vehicles can be rapidly made.

As described above, the magnetic marker 1 configuring the driving assistance system 1A of the present example includes the RFID tag 15 as an information providing unit. On the vehicle 5 side, by detecting the magnetic marker 1 by a magnetic method, it is possible to, for example, detect the presence or absence of the magnetic marker 1 and a lateral shift amount in the vehicle width direction of the vehicle 5, and also information useful for driving assist can be acquired from the base station 6 via the code information acquired from the magnetic marker 1. With the driving assistance system 1A in which the high-functionality magnetic marker 1 including the RFID tag 15 is laid on a travelling road, it is possible to achieve various driving assists by utilizing the magnetic marker 1.

Note that in the magnetic marker 1 of the present example, the magnetic flux density Gs of the surface is reduced to 1 millitesla while the magnetic characteristics detectable by the magnetic sensor 2 are ensured. This magnetic flux density of 1 millitesla is further smaller than, for example, $\frac{1}{10}$ of the magnetic flux density on the order of 20 millitesla to 40 millitesla of the surface of a magnet sheet to be affixed to a whiteboard, a door of a refrigerator, or the like. The magnetic marker 1 has a very weak magnetic force even compared with this magnet sheet for office or household use.

As described above, if the magnetic field generated by the magnetic marker 1 is very weak, efficiency of electromagnetic induction when electric power is transmitted from the vehicle 5 side can be enhanced, and reliability and efficiency of electric power transmission can be ensured. Also, the RFID tag 15 and the tag reader 3 each adopt a loop-shaped magnetic field antenna for detecting magnetic field components and so forth as the antennas 154 and 330 for information transmission and reception. If the peripheral magnetic field is large, there is a possibility of occurrence of an influence on information transmission and reception. However, if the magnetic field generated by the magnetic marker 1 is very weak, the fear of impairment of reliability of wireless communication is small.

Note in the present example that an isotropic ferrite rubber magnet, which is a bond magnet made by mixing rubber as a binder into a magnetic powder of iron oxide, is exemplarily described as the magnet sheet 11 serving as a magnetism generating unit of the magnetic marker 1. The magnet of the magnetic marker may be a bond magnet such as a plastic magnet made by mixing a raw material, magnetic powder of iron oxide, into a plastic as a binder and dissolving and then molding the resultant material with a metal mold, or may be a sintered magnet made by sintering a raw material, or the like.

The ferrite magnet serving as the magnet sheet 11 has a characteristic of large electrical resistance. Therefore, when electric power is transmitted by electromagnetic induction, the fear of occurrence of eddy current on the surface of the magnet sheet 11 is small, and transmission efficiency at the time of wireless transmission of electric power can be ensured. Also, in the magnet sheet 11, which is a bond magnet made by crushing a magnet and mixing the magnet into rubber as a binder, the crushed magnet is bounded by the binder as an insulator, and electrical resistance is very large. Therefore, with this magnet sheet 11, the fear of occurrence of a high-frequency loss is hardly present when the RFID tag 15 performs wireless communication.

With the magnet sheet 11 formed of a bond magnet with a small high-frequency loss, attenuation of radio waves can be avoided, and therefore flexibility in placement of the RFID tag 15 can be enhanced. For example, placement can be made in a manner such that: the RFID tag 15 is placed so as to be affixed to the front surface, back surface, or side surface of the magnet sheet 11 or the magnetic marker 1; the RFID tag 15 is placed inside the magnet sheet 11 or the magnetic marker 1; and the RFID tag 15 is placed on a lower side of the magnetic marker 1.

When a bond magnet with a small high-frequency loss is adopted as a magnet of the magnetic marker, a high frequency equal to or higher than 100 kHz can be selected as a carrier frequency of wireless communication by the RFID tag 15. If the carrier frequency is a high frequency, it is easy to decrease the size of the RFID tag. In particular, for example, if a carrier frequency of a 900-MHz band is used, transmission capability is high, and therefore it is relatively easy to ensure communication stability and robustness can be improved.

As described above, when a bond magnet with small high-frequency loss such as a rubber magnet or plastic magnet is adopted as a magnet of the magnetic marker, for example, the carrier frequency in the 900-MHz band is adopted, thereby achieving robustness in wireless communication and downsizing of the RFID tag at the same time. Note that a similar effect can be expected with an RFID tag using a frequency band from 710 MHz to 960 MHz.

While a sensor using the MI element 21 is exemplarily described as the magnetic sensor 2, in place of this, a flux gate sensor or a TMR sensor can be adopted as a magnetic sensor. When two or more magnetic sensors are used, two types or more of the MI sensor, the flux gate sensor, and the TMR sensor can be combined for adoption. The position of the magnetic sensor set in the vehicle is at a distance on the order of at least 100 mm from the road surface of the road. As the magnetic sensor, it is required to adopt a sensor having a capability of easily detecting magnetism generated by the magnetic marker 1 placed on the road surface.

The type of the magnetic material and the magnet of the magnet sheet 11 configuring the magnetic marker 1 are not limited to the present example. As a type of the magnetic material and the magnet, any of various materials and types can be adopted. It is preferable that appropriate magnetic material and type are selectively determined in accordance with magnetic specifications and environmental specifications required for the magnetic marker 1.

Note that as for the RFID tag 15 and the tag reader 3, an antenna for electric power transmission and an antenna for transmitting or receiving information can be used in a shared manner.

While the RFID tag 15 is provided on the front surface side of the magnetic marker 1 in the present example, the RFID tag 15 may be provided on the back surface side. When the magnetic marker 1 is laid on the road surface, the RFID tag 15 is positioned on the back side of a main body of the magnetic marker 1. For example, even if the magnetic marker 1 is stepped by the vehicle tire, the RFID tag 15 can be protected by the main body of the magnetic marker 1, and therefore the configuration of protecting the RFID tag 15 can be simplified.

In the present example, after the RFID tag 15 is laminated and placed on the surface of the magnet sheet 11, a layer of the resin mold 12 is formed on the front surface side of the magnet sheet 11. In place of this, the RFID tag may be laminated and placed on the surface of the magnetic marker 1 after the resin mold layer is formed. The same goes for the case in which the RFID tag is placed on the back surface side or the side surface side of the magnetic marker 1.

If it is configured that the two-dimensional position information is provided to the vehicle 5 side, a vehicle-to-vehicle communication apparatus capable of mutual communication between the vehicles 5 may be provided to each vehicle 5. In this case, each vehicle 5 on the road can wirelessly transmit and receive position information to and from another. If each vehicle 5 can grasp the position relation with other peripheral vehicles, safety and accuracy in vehicle control for driving assist including automatic driving can be improved. As position information about its own vehicle position to be exchanged among the vehicles, position information based on the position information provided from the base station 6 may be used. For example, position information with a corrected lateral shift amount in the vehicle width direction of the own vehicle with respect to the magnetic marker 1 may be set as an own vehicle position, or position information including travelling information by inertial navigation after passing through the magnetic marker 1 may be set as an own vehicle position.

Furthermore, if travelling information such as speed information and acceleration information is exchanged via vehicle-to-vehicle communication in addition to the position information, it is possible to grasp the position relation with other peripheral vehicles and behaviors of the other vehicles. In this case, for example, when a preceding vehicle that is two vehicles ahead pulls on brakes, whether evading brake control is required can be appropriately determined, thereby enhancing accuracy of vehicle control and improving safety. Also, a driving assist can be made, such as, for example, alarming when the vehicle that is two vehicles ahead pulls on brakes.

In the present example, the sheet-shaped magnetic marker 1 is exemplarily described as a magnetic marker. The shape of the magnetic marker may be a columnar shape having a circular cross section, polygon cross section, or the like. As a combination of the height and the outer diameter of the columnar-shaped magnetic marker, the magnetic marker may have a slender columnar shape with the height dimension being longer than the outer diameter, or a short columnar shape with the outer diameter dimension being longer than the height. For example, the magnetic marker may have a cylinder shape having a height of 10 mm to 20 mm and a diameter of 25 mm to 30 mm. Note that in the case of this cylinder-shaped magnetic marker, a ferrite plastic magnet, which is one type of bond magnets, is preferably adopted.

When a columnar-shaped magnetic marker is laid, an accommodation space such as a recess or hole for accommodating the magnetic marker is preferably formed in advance in the road. As for the accommodation space, a large dimension in a depth direction is preferably ensured with respect to the height of the magnetic marker. In this case, the upper end face of the magnetic marker placed in the accommodation space is lower than the road surface. For example, it is preferable to perform sealing by filling with a methacrylate-resin-based filler to enhance uniformity with the peripheral road surface. Note that asphalt may be adopted as a filler.

Furthermore, in filling with the filler, a woven fabric or nonwoven fabric made of glass fiber, carbon fiber, cellulose nanofiber, or the like may be placed on the upper end face side of the magnetic marker. In this case, with the woven fabric or non-woven fabric impregnated with the filler, the characteristics of the filler can be reinforced. The size of the woven fabric or non-woven fabric may be smaller than the cross-sectional shape of the accommodation space, or may be one size larger than the cross-sectional shape of the accommodation space. A woven fabric or the like larger than the cross-sectional shape of the accommodation space can integrally cover the magnetic marker and the road surface around the accommodation space together. In this case, an opening portion of the accommodation space can be protected integrally with the peripheral road surface. For example, a depression or the like at the opening portion of the accommodation space can be reduced, and a favorable laying state of the magnetic marker can be maintained for a long time in the operation of the road over a long period of time.

Second Embodiment

The present example is an example in which the magnetic marker 1 having an pictorial pattern formed on a surface side is adopted in place of the magnetic marker of the first embodiment. Details of this are described with reference to FIG. 9 and FIG. 10.

The shape specifications and the magnetic specifications of the magnetic marker 1 of FIG. 9 are similar to those of the first embodiment, and a surface treatment with a resin mold or the like is also similar. A different point is that the RFID tag 15 is not laminated or placed on the surface side and a code image 18, which is a pictorial pattern serving as one example of the information providing unit, is formed instead by printing or the like. Also, the vehicle-mounted unit configuring the driving assistance system of the present example includes a combination (omitted in the drawing) of a camera which takes an image of the road surface 63 and an image ECU which performs image processing on the taken image of the magnetic marker 1 to read code information from the code image 18, the combination being taken as one example of the information acquiring unit, in place of the tag reader of the first embodiment.

In the magnetic marker 1 of FIG. 9, for example, a film having the code image 18 such as, for example, a barcode or QR code (registered trademark) printed thereon is laminated and placed on the surface of the magnet sheet 11, and a transparent resin mold layer is further laminated on that surface.

The camera on the vehicle 5 side is attached with the lens oriented downward so as to be able to take an image of the surface of the magnetic marker 1 laid on the road surface 63. The image ECU is configured to capture the image taken by the camera and perform image processing if the magnetic marker 1 has been magnetically detected and performs cutting-out of a code image area and reading of code information represented by the code image 18.

Note that in place of the present example, the code image may be printed or the like directly on the surface of the resin mold covering the surface side of the magnet sheet 11. In this case, a transparent protective layer may be provided on the surface side of the code image. Also, a code image having asperities, for example, with white convex portions and black concave portions, may be formed.

Also, for example, a white sheet with holes provided only to black portions in the code image may cover the magnet sheet 11 so that the black portions of the magnet sheet 11 can be externally seen through the holes, thereby displaying the code image by contrast with the white portions of the white sheet.

Note that any of color patterns may be displayed in place of the code image. The color patterns include a pattern of a single color type and a multi-colored pattern. In the case of a single color, it can be thought that, for example, a safe location is displayed in blue and a dangerous location with many accidents is in red, or an intersection is in red, a merging road is in yellow, and a branching road is in blue. As a multi-colored pattern, for example, as depicted in FIG. 10, code information may be represented by a multi-colored pattern 19 with four areas divided by angle.

Also, if the information amount providable by the magnetic marker 1 at one location is not sufficient for a purpose, pictorial patterns of a plurality of, such as two, magnetic markers 1 adjacent to each other in the travelling direction of the vehicle 5 can be combined to represent one piece of code information.

Note that other configurations and operations and effects are similar to those of the first embodiment.

Third Embodiment

The present example is an example in which the configuration for providing code information to a vehicle side is changed based on the driving assistance system of the first embodiment. Information to be provided by the base station to the vehicle side in response to reception of the code information is two-dimensional position information similar to that of the first embodiment. Details of this are described with reference to FIG. 11 to FIG. 19.

In a driving assistance system 1A, as in FIG. 11, a plurality of magnetic markers 1 are one-dimensionally laid along a center 630L of a lane 630 serving as a travelling road of the vehicle 5. The magnetic marker 1 of the present example is based on the magnetic marker of the first embodiment, with the RFID tag omitted, and the thicknesses of the resin molds on both front and back surface sides forming the S pole and the N pole are 0.3 mm both so that the magnetic marker can be laid without distinction between front and back.

The driving assistance system 1A has a feature as in FIG. 12 and FIG. 13 in which an information providing section for providing code information to a vehicle 5 side by using the magnetic markers 1 is set. In this information providing section, marker laying locations 64 where there is a possibility of laying the magnetic markers 1 are set for each specified distance (for example, 2 m) along the lane 630. At each of the marker laying locations 64 in the information providing section, any of a mode 1N in which laying is made with the N pole on the upper surface, a mode 1S in which laying is made with the S pole on the upper surface, and a mode 1E in which no magnetic marker 1 is laid is set as a laying mode of the magnetic marker 1. A combination of the laying modes of the magnetic markers 1 at the plurality of marker laying locations 64 represents code information. By reading this combination of the laying modes, it is possible to acquire the code information on the vehicle 5 side. Note that the information providing section has five marker laying locations 64 in the present example.

Note that before the information providing section, a start position identifying section is formed in which five N-pole magnetic markers 1 are successively laid along a longitudinal direction (travelling direction) of the lane 630. Also in this start position identifying section, a space between adjacent magnetic markers 1 is the above-described defined distance. Note that the magnetic markers 1 preferably have the S pole in a non-information providing section which is not the information providing section or the start position identifying section. When the magnetic markers 1 in the non-information providing section have the S pole, identification of the start position identifying section where the magnetic markers 1 with the N pole are arrayed is facilitated.

In the vehicle 5 on the side of detecting the magnetic marker 1, as in FIG. 14, the system on the vehicle 5 side is formed mainly with a vehicle-mounted unit 45 and the road-to-vehicle communication unit 41 performing various arithmetic processes and display processes. This system on the vehicle 5 side includes the following functions.

(1) Laying Location Identifying Unit: identifying the position of the marker laying location 64 with a possibility of the magnetic marker 1 to be laid.

(2) Magnetism Detecting Unit: performing detection of the magnetic marker 1 as for the location identified as the marker laying location 64.

(3) Information Acquiring Unit: reading code information by combination of detection results of a plurality of magnetic markers 1 and acquiring corresponding position information from the base station.

(4) Assist Unit: performing driving assist using the magnetic markers 1.

(1) Laying Location Identifying Unit

The laying location identifying unit is configured to include, as in FIG. 14, a vehicle speed sensor 459 which generates a pulse signal every time the tire of the vehicle 5 rotates once, a laying database 451 having stored therein laying data for identifying the positions of the marker layer locations 64, and the vehicle-mounted unit 45 which identifies the marker laying locations 64. The laying data includes a code representing a start position of the information providing section (the combination of the laying modes of the magnetic markers 1 in the above-described start position specifying section), distance data representing the defined distance, which is a space between the marker laying locations 64, and so forth.

(2) Magnetism Detecting Unit

The magnetism detecting unit is configured to include the magnetic sensor 2. The magnetic sensor 2 has specifications similar to those of the first embodiment, and the same goes for specifications of attachment to the vehicle. The magnetic sensor 2 of the present example tries to detect the magnetic marker 1 every time the vehicle 5 reaches the marker laying location 64 in the information providing section (FIG. 12) and, when detecting the magnetic marker, determines the polarity of the magnetic marker 1. Note that a method of determining the polarity by the magnetic sensor 2 will be described further below.

(3) Information Acquiring Unit

The information acquiring unit is configured by a combination of the vehicle-mounted unit 45 (FIG. 14) which reads the code information from the magnetic marker 1 side and the road-to-vehicle communication unit 41 (FIG. 14) which transmits the code information to the base station and receives a reply with corresponding position information. The vehicle-mounted unit 45 is a unit which reads code information representing a combination of laying modes of the magnetic markers 1 (the presence or absence and the polarity of the magnetic marker 1) at the marker laying locations 64 in the information providing section (refer to FIG. 12). Note that in the present example, a five-digit code is adopted for both of the information providing section and the start position identifying section as code information represented by the laying mode of the magnetic marker 1. Note that the position information with which a reply is made by the base station is information representing the absolute position of the last marker laying location among the five marker laying locations 64 configuring the information providing section.

(4) Assist Unit

As with the first embodiment using position information provided from the base station, the assist unit of the present example performs a navigation system, which is one example of the driving assistance system.

Next, a method of determining the polarity of the magnetic marker 1 is described. As described in the first embodiment, in the magnetic sensor 2, an amorphous wire as a magneto-sensitive body is placed along the travelling direction. Therefore, for example, as in FIG. 15, the magnetic sensor 2 outputs a sensor signal with a positive value when positioned before the magnetic marker 1 with the N pole and outputs a sensor signal with a negative value when passing through the magnetic marker 1 with the N pole. Also, the magnetic sensor 2 outputs a sensor signal with a negative value when positioned before the magnetic marker 1 with the S pole, and outputs a sensor signal with a positive value when passing through the magnetic marker 1 with the S pole. Determination of the polarity of the magnetic marker 1 can be achieved by determining whether the value of the sensor signal before and after passing the magnetic marker 1 is positive or negative, by determining whether a differential value of the sensor signal (gradient of changes of the sensor signal) is positive or negative, or the like.

Next, the operation on the vehicle 5 side in the driving assistance system 1A of the present example is described by using FIG. 16, mainly the operation of the vehicle-mounted unit 45 and the road-to-vehicle communication unit 41.

While the vehicle 5 is travelling on the road where the above-described information providing section (refer to FIG. 12) is set, the vehicle-mounted unit 45 repeatedly performs detection of the magnetic marker 1 until identifying the start position of the information providing section (S101). When detecting the magnetic marker 1 (S101: YES), the vehicle-mounted unit 45 sequentially passes each digit of the five-digit code where the combinations of the laying modes of the magnetic markers 1 are stored to a higher order and sets the least significant bit as an empty bit, and sequentially sets a newly-detected value of the magnetic marker 1 (S102). Note that in the driving assistance system 1A, the laying mode in which the N pole is detected is handled as a value of 1, the laying mode in which the S pole is detected is as a value of 2, and the laying mode without a magnetic marker is as a zero value.

As described above, when the vehicle 5 enters the start position identifying section (refer to FIG. 12) where five magnetic markers 1 with the N pole are successively laid, the fifth magnetic marker 1 with the N pole is detected, and the five-digit code becomes "11111" (S103: YES), the vehicle-mounted unit 45 identifies the start position of the information providing section. Specifically, the vehicle-mounted unit 45 identifies the laying position of the fifth magnetic marker 1 with the N pole in the longitudinal direction (travelling direction) of the lane 630 as the start position of the information providing section (refer to FIG. 12) (S104), and resets the travelling distance of the vehicle 5 to zero (S105).

When the vehicle 5 enters the information providing section, the vehicle-mounted unit 45 computes a travelling distance from the number of times of pulse signals outputted by the vehicle speed sensor 459 every time the tire rotates once. Every time this travelling distance reaches the defined distance, which is a space between the marker laying locations 64 in the information providing section (S106: YES), the vehicle-mounted unit 45 performs process of detecting the magnetic marker 1 (S107). In this detection process, determination as to the presence or absence and the polarity of the magnetic marker 1 is performed with reference to changes of the sensor signal of the magnetic sensor 2 in a range of temporally previous and subsequent times including the moment of reaching the marker laying location 64.

The vehicle-mounted unit 45 sequentially passes each digit of the five-digit code to a higher order and sets the least significant bit as an empty bit whenever performing the process of detecting the magnetic marker 1, and adds a bit value representing a new detection result. When the magnetic marker 1 with the N pole is detected (S108: N pole), a bit value of 1 is added (S119). When the magnetic marker 1 with the S pole is detected (S108: S pole), a bit value of 2 is added (S129). When the magnetic marker 1 cannot be detected (S108: none), a bit value of 0 is added (S139).

The vehicle-mounted unit 45 repeatedly performs processes at the above-described step S105 onward whenever reaching the marker laying location 64 until passing the five marker laying locations 64 in the information providing section to generate a five-digit code (S110: NO). Then, when the vehicle-mounted unit 45 passes the five marker laying locations 64 in the information providing section and generates code information formed of the five-digit code (S110: YES), the road-to-vehicle communication unit 41 transmits the code information to the base station (S111). This allows information corresponding to this code information to be received from the base station via the road-to-vehicle communication unit 41 (S112).

As described above, in the driving assistance system 1A of the present example, the code information can be provided to the vehicle 5 side by the combination of the laying modes of the magnetic markers 1 in the information providing section. In particular, in this driving assistance system 1A, any of the laying mode 1N with the N pole on the upper surface, the laying mode IS with the S pole on the upper surface, and the laying mode 1E without the magnetic marker 1 being laid can be set as the laying mode, and therefore three values can be represented by one marker laying location 64. For example, with five marker laying locations 64, the fifth power of 3=243 codes can be represented. In the laying modes only with the N pole and the S pole, only the fifth power of 2=32 codes can be represented with the five marker laying locations. The driving assistance system 1A of the present example where the mode without the magnetic marker 1 is provided has superiority capable of efficiently providing code information by using a small number of magnetic markers 1.

Note that when a driving assist such as lane departure warning, automatic steering, or lane departure avoiding control is performed as a driving assist using the magnetic markers 1, if a space between the adjacent magnetic markers 1 is wide, the accuracy of warning may be impaired. Therefore, in the configuration of the present example provided with the mode in which the magnetic marker 1 is not laid, it is required to give sufficient consideration so that the space between the adjacent magnetic markers 1 is not too wide. For example, if the magnetic markers 1 in the information providing section are used also for lane departure warning or the like, the configuration is preferably such that a maximum space between the adjacent magnetic markers 1 in the information providing section is equal to or smaller than a laying space of the magnetic markers 1 in the non-information providing section. For example, the configuration is preferably such that the specified distance as a space between the marker laying locations 64 in the information providing section is set at ½ of a laying space required for lane departure warning or the like and the modes in which the magnetic marker 1 is not laid are not successively provided at two locations. In this case, the maximum space between the magnetic markers 1 in the information providing section can be set equal to the laying space required for lane departure warning or the like.

Also, for example, as in FIG. 17, in the information providing section, the marker laying locations 64 may be set adjacently to a downstream side in the travelling direction (longitudinal direction of the road) with respect to the magnetic markers 1 for the purpose of lane departure warning or the like. In this manner, if the magnetic markers for information provision are laid separately from the magnetic markers for lane departure warning or the like, it is possible to dissolve the fear of an influence of the laying mode of the magnetic markers 1 at the marker laying locations 64 on lane departure warning or the like. Note that in this configuration, the positions of the marker laying locations 64 can be identified by detecting the magnetic marker 1 for lane departure warning or the like. The magnetic sensor which detects the magnetic marker 1 functions as a laying location specifying unit which positionally identifies the marker laying location 64. Note that the marker laying locations 64 may be provided adjacently in the vehicle width direction with respect to the magnetic markers 1 for lane departure warning or the like.

The number of marker laying locations 64, the specified distance forming a space, and so forth in the information providing section (FIG. 12) are not limited to the values in the present example, and can be modified as appropriate. While the number of marker laying locations 64 in the information providing section and the number of magnetic markers 1 laid in the start position identifying section are both five in the present example, each number can be modified as appropriate and may be set at different numbers. While the marker laying locations are one-dimensionally arrayed along the longitudinal direction of the lane 630 in the present example, the marker laying locations 64 may be one-dimensionally arrayed in a width direction of the lane as in FIG. 18. In this case, a sensor unit 2U having a plurality of magnetic sensors 2 arrayed in the vehicle width direction is preferably attached to the vehicle 5. Furthermore, as in FIG. 19, the marker laying locations 64 may be two-dimensionally arrayed. In this case, more pieces of information can be provided at a short distance.

Note that other configurations and operations and effects are similar to those of the first embodiment or the second embodiment.

Fourth Embodiment

The present example is an example in which the code information providing method by combination of a plurality of magnetic markers is changed based on the third embodiment. While the configuration of a start position identifying section for identifying a start position of the information providing section for providing code information is similar to that of the third embodiment, the configuration of the information providing section is different.

(First Configuration Example) While each magnetic marker to be laid in the information providing section has a constant polarity, laying spaces of the adjacent two magnetic markers 1 are different. As a laying space, 1.6 m, 1.8 m, 2.0 m, 2.2 m, 2.4 m, or the like is set. And, as a bit value corresponding to each laying space, a value of 1 to 5 is set.

Code information is represented by a combination of laying spaces of the adjacent two magnetic markers in the information providing section. Note that a bit value corresponding to a change of the adjacent two laying spaces may be set. As for the adjacent two laying spaces, for example, a bit value of 1 may be set when the laying space becomes long, a bit value of 2 may be set when the laying space becomes short, and a bit value of 0 may be set when the laying space is not changed.

The above-described adjacent two laying spaces between the magnetic markers refer to two laying spaces between the magnetic markers positioned adjacently to each other without intervention of another magnetic marker. In place of this, two laying spaces between the magnetic markers positioned with intervention of another single magnetic marker may be used, and two laying spaces between the magnetic markers positioned with intervention of other two magnetic markers may be used.

Note that a plurality of magnetic markers can be laid in the vehicle width direction at the respective laying locations placed in the longitudinal direction of the lane in the information providing section and whether the space therebetween is wide or narrow can represent information.

Second Configuration Example

Each magnetic marker to be laid in the information providing section has the same polarity but has a different strength of magnetic field to be generated. As a magnetic field strength, strong or weak is set. Note that a weak magnetic marker is sufficiently detectable by the magnetic sensor.

As for adjacent two magnetic markers, for example, a bit value of 1 is set for a change in which the magnetic strength detected by the magnetic sensor is increased, a bit value of 2 is set for a change in which the magnetic strength is decreased, and a bit value of zero is set for a change in which the magnetic strength is not changed. In this configuration, code information is represented by a combination of changes of the magnetic field strengths generated by the adjacent two magnetic markers. Note that code information may be represented by setting a bit value of 1 for the magnetic marker with a strong magnetic field strength and setting a bit value of zero for the magnetic marker with a weak magnetic field strength.

Third Configuration Example

While each magnetic marker to be laid on the information providing section has the same polarity, the number of magnetic markers to be laid at one location is different. At each of laying locations placed at a space of 2 m in the information providing section, for example, one to three magnetic markers are laterally placed. On the vehicle side, ten magnetic sensors or so are laterally arrayed, and the number of magnetic markers placed in the width direction can be identified. In this configuration, the number of magnetic markers laterally placed represents a bit value, and code information is represented by the number of magnetic markers placed at the respective laying locations configuring the information providing section.

As for the configuration for providing code information by using the magnetic markers, the exemplarily-described configurations can be combined as appropriate. By combining the respective configurations, information can be more efficiently represented.

Furthermore, code information may be represented by the placement shape of the magnetic markers at the marker laying locations or combination thereof. As the placement shape, shapes include one lateral line, one vertical line, two lateral lines, vertical two lines, a triangle, a diamond, and so forth. Also, code information may be represented by combination of placement shapes of a plurality of marker laying locations.

Note that other configurations and operations and effects are similar to those of the other embodiments.

While the specific examples of the present invention have been described above in detail as in the above embodiments, these specific examples merely describe examples of technologies included in the claims. Needless to say, the claims should not be restrictively construed by the structures, numerical values, and so forth of the specific examples. The claims include technologies obtained by variously modifying, changing, and combining the specific examples as appropriate by using known technologies, knowledge by people skilled in the art, and so forth.

REFERENCE SIGNS LIST 1 magnetic marker
1A driving assistance system
11 magnet sheet (magnetism generating unit)
12 resin mold
15 RFID tag (radio tag, information providing unit)
18 code image (information providing unit)
19 multi-colored pattern (information providing unit)
2A vehicle-mounted unit
2 magnetic sensor (magnetism detecting unit)
21 MI element
3 tag reader (information acquiring unit)
41 road-to-vehicle communication unit
45 vehicle-mounted unit
459 vehicle speed sensor
5 vehicle
50 vehicle body floor (bottom surface)
6 base station
60 communication unit
63 road surface
64 marker laying location

The invention claimed is:

1. A driving assistance system comprising:
a plurality of magnetic markers laid on a travelling road configured to provide code information to a vehicle, each of the plurality of magnetic markers being magnetically detectable by the vehicle;
the vehicle comprising
processing circuitry configured to
magnetically detect the plurality of magnetic markers,
read the code information from the plurality of magnetic markers, and
transmit the read code information to a base station; and
the base station configured to transmit corresponding information corresponding to the code information to the vehicle in response to receiving the code information from the vehicle, wherein the processing circuitry of the vehicle is further configured to perform driving assistance control to assist driver's driving by processing the corresponding information received from the base station, at least one of the plurality of magnetic markers include a magnet and a radio tag which wirelessly outputs the code information, the magnet is a component independent from the radio tag, and the magnet generates a peripheral magnetic field independently from the radio tag, the radio tag is a component independent from the magnet, and the radio tag provides the code information to the vehicle independently from the magnet, the radio tag is laminated and provided on a surface of the magnet, the radio tag and at least a part of the surface of the magnet, on which the radio tag is laminated and provided, are covered by a sheet of a resin mold, the magnet has a thickness of less than or equal to 1.0 mm, and the magnet has a maximum energy product (BHmax) of 6.4 kJ/m3 or less.

2. The driving assistance system according to claim 1, wherein
the magnet is molded including magnetic powder.

3. The driving assistance system according to claim 2, wherein
the magnet is a bond magnet made by including the magnetic powder into a binder made of a high-polymer material, and
the radio tag uses a frequency band of 710 MHz to 960 MHz.

4. The driving assistance system according to claim 2, wherein
the base station includes:
a database which stores position information representing an absolute position of the corresponding magnetic markers linked with the code information; and
processing circuitry configured to read the position information linked with any of the code information of the position information of the magnetic markers stored in the database, and
the corresponding information includes position information linked with the code information in the database which stores the position information of the magnetic marker.

5. The driving assistance system according to claim 1, wherein
the base station includes:
a database which stores position information representing an absolute position of the corresponding magnetic markers linked with the code information; and
processing circuitry configured to read the position information linked with any of the code information of the position information of the magnetic markers stored in the database, and
the corresponding information includes position information linked with the code information in the database which stores the position information of the magnetic marker.

6. The driving assistance system according to claim 1, wherein
both front and back surface sides of the magnet are covered by the sheet of the resin mold.

7. The driving assistance system according to claim 1, wherein
the magnet is a flat magnet sheet having a round shape.

8. The driving assistance system according to claim 7, wherein
the radio tag is provided on a surface of the flat magnet sheet at a center area of the round shape.

9. The driving assistance system according to claim 1, wherein
the processing circuitry of the vehicle is configured to magnetically detect the peripheral magnetic field generated by the magnet to detect presence or absence of the magnetic marker.

10. The driving assistance system according to claim 1, wherein
the processing circuitry of the vehicle is configured to magnetically detect the peripheral magnetic field generated by the magnet to detect a lateral shift amount in a vehicle width direction of the vehicle.

11. The driving assistance system according to claim 1, wherein
the magnet is a ferrite magnet.

12. The driving assistance system according to claim 1, wherein
the magnetic marker has a thickness of less than or equal to 2.0 mm.

13. The driving assistance system according to claim 1, wherein
the radio tag has a thickness of less than or equal to 0.5 mm.

14. The driving assistance system according to claim 1, wherein
the sheet of the resin mold has a thickness of 0.5 mm to 1.0 mm.

15. The driving assistance system according to claim 1, wherein
a magnetic flux density Gs of the surface of the magnetic marker is 1 millitesla or less.

16. The driving assistance system according to claim 1, wherein
the magnet is a bond magnet made by including a magnetic powder of an iron oxide into a binder made of a high-polymer material.

17. The driving assistance system according to claim 15, wherein
the magnet is a bond magnet made by including a magnetic powder of an iron oxide into a binder made of a high-polymer material.

* * * * *